United States Patent
Bishop et al.

(10) Patent No.: US 8,832,716 B2
(45) Date of Patent: Sep. 9, 2014

(54) SYSTEMS AND METHODS FOR LIMITING USER CUSTOMIZATION OF TASK WORKFLOW IN A CONDITION BASED HEALTH MAINTENANCE SYSTEM

(75) Inventors: Douglas L. Bishop, Phoenix, AZ (US); Petr Dolak, Brno (CZ); Miroslav Krupa, Brno (CZ); Douglas Allen Bell, Peoria, AZ (US); Tim Felke, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 166 days.

(21) Appl. No.: 13/572,518

(22) Filed: Aug. 10, 2012

(65) Prior Publication Data

US 2014/0047448 A1    Feb. 13, 2014

(51) Int. Cl.
*G06F 3/00* (2006.01)
*G06F 9/46* (2006.01)

(52) U.S. Cl.
USPC ............................ 719/318; 718/100; 718/101

(58) Field of Classification Search
None
See application file for complete search history.

(56) References Cited

U.S. PATENT DOCUMENTS

| | | | |
|---|---|---|---|
| 4,047,162 A | 9/1977 | Dorey et al. | |
| 4,296,409 A | 10/1981 | Whitaker et al. | |
| 4,890,284 A | 12/1989 | Murphy et al. | |
| 5,020,135 A | 5/1991 | Kasparian et al. | |
| 5,086,429 A | 2/1992 | Gray et al. | |
| 5,550,736 A | 8/1996 | Hay et al. | |
| 5,754,823 A | 5/1998 | Mudryk, Jr. et al. | |
| 5,881,270 A | 3/1999 | Worthington et al. | |
| 5,884,077 A | 3/1999 | Suzuki | |
| 5,941,918 A | 8/1999 | Blosser | |
| 6,094,609 A | 7/2000 | Arjomand | |

(Continued)

FOREIGN PATENT DOCUMENTS

| | | |
|---|---|---|
| EP | 1933563 A1 | 6/2008 |
| EP | 2482159 A2 | 8/2012 |
| EP | 2527977 A2 | 11/2012 |
| WO | 2005025194 A1 | 3/2005 |

OTHER PUBLICATIONS

Bell, D. A., et al.: "Method for Performing Condition Based Data Acquisition in a Hierarchically Distributed Condition Based Maintenance System" filed with the USPTO on Sep. 28, 2012 and assigned U.S. Appl. No. 13/630,906.

(Continued)

*Primary Examiner* — Adam Lee
(74) *Attorney, Agent, or Firm* — Ingrassia Fisher & Lorenz, P.C.

(57) ABSTRACT

Systems and methods are provided for customizing workflow in a condition based health maintenance ("CBM") system computing node. The computerized method comprises identifying a first standardized executable application module ("SEAM"), wherein the first SEAM is configured to generate a first event associated with particular data being processed by the first SEAM and identifying a second SEAM, wherein the second SEAM is configured to generate a subsequent event associated with the particular data processed by the first SEAM. The computerized method further comprises creating a quasi-state machine associating a unique responses to the first event and associating a unique responses to the subsequent event, and installing the quasi-state machine into the SDS of the computing node from which the workflow service state machine retrieves the one or more unique responses from the quasi-state machine to the first event for processing by the second SEAM to produce the subsequent second event.

14 Claims, 9 Drawing Sheets

(56) References Cited

U.S. PATENT DOCUMENTS

| | | | |
|---|---|---|---|
| 6,104,803 A | 8/2000 | Weser et al. | |
| 6,128,560 A | 10/2000 | Ishii | |
| 6,185,613 B1 | 2/2001 | Lawson et al. | |
| 6,353,896 B1* | 3/2002 | Holzmann et al. | 714/38.1 |
| 6,401,098 B1 | 6/2002 | Moulin | |
| 6,434,455 B1 | 8/2002 | Snow et al. | |
| 6,438,470 B1 | 8/2002 | Hiramatsu | |
| 6,493,616 B1 | 12/2002 | Rossow et al. | |
| 6,615,090 B1 | 9/2003 | Blevins et al. | |
| 6,624,909 B1 | 9/2003 | Czyszczewski et al. | |
| 6,728,611 B2 | 4/2004 | Kamiya | |
| 6,757,897 B1 | 6/2004 | Shi et al. | |
| 6,766,230 B1 | 7/2004 | Rizzoni et al. | |
| 6,789,007 B2 | 9/2004 | Ellis et al. | |
| 6,823,512 B1 | 11/2004 | Miller et al. | |
| 6,832,141 B2 | 12/2004 | Skeen et al. | |
| 6,904,483 B2 | 6/2005 | Koning et al. | |
| 6,910,156 B2 | 6/2005 | Adam | |
| 6,928,358 B2 | 8/2005 | Brooks et al. | |
| 6,937,926 B2 | 8/2005 | Lipscomb et al. | |
| 6,950,782 B2 | 9/2005 | Qiao et al. | |
| 7,065,050 B1 | 6/2006 | Herbst | |
| 7,072,879 B2 | 7/2006 | Soemo et al. | |
| 7,079,984 B2 | 7/2006 | Eryurek et al. | |
| 7,124,302 B2 | 10/2006 | Ginter et al. | |
| 7,142,953 B2 | 11/2006 | Marshall et al. | |
| 7,188,207 B2 | 3/2007 | Mitter | |
| 7,209,817 B2 | 4/2007 | Abdel-Malek et al. | |
| 7,222,800 B2 | 5/2007 | Wruck | |
| 7,237,223 B2 | 6/2007 | Leu et al. | |
| 7,272,475 B2 | 9/2007 | Gawlik et al. | |
| 7,295,903 B2 | 11/2007 | Siebel et al. | |
| 7,319,947 B1 | 1/2008 | Khaira et al. | |
| 7,349,825 B1 | 3/2008 | Williams et al. | |
| 7,363,420 B2 | 4/2008 | Lin et al. | |
| 7,379,799 B2 | 5/2008 | Cleary et al. | |
| 7,379,845 B2 | 5/2008 | Gorinevsky et al. | |
| 7,415,606 B2 | 8/2008 | Tuvell et al. | |
| 7,444,216 B2 | 10/2008 | Rogers et al. | |
| 7,447,643 B1 | 11/2008 | Olson et al. | |
| 7,493,482 B2 | 2/2009 | Ring et al. | |
| 7,522,979 B2 | 4/2009 | Pillar | |
| 7,523,133 B2 | 4/2009 | Mackie | |
| 7,593,403 B2 | 9/2009 | Kalkunte et al. | |
| 7,596,785 B2 | 9/2009 | Burkhardt et al. | |
| 7,606,843 B2 | 10/2009 | Alexander et al. | |
| 7,617,029 B2 | 11/2009 | Loda | |
| 7,710,871 B2 | 5/2010 | Lavian et al. | |
| 7,757,120 B2 | 7/2010 | Ogle et al. | |
| 7,761,201 B2 | 7/2010 | Avery et al. | |
| 7,779,039 B2 | 8/2010 | Weissman et al. | |
| 7,929,562 B2 | 4/2011 | Petrovykh | |
| 7,950,017 B1 | 5/2011 | Cain et al. | |
| 7,990,857 B2 | 8/2011 | Jain et al. | |
| 8,054,208 B2 | 11/2011 | Fletcher et al. | |
| 8,135,995 B2 | 3/2012 | Ngai et al. | |
| 8,145,444 B1 | 3/2012 | Bickford et al. | |
| 8,151,141 B1 | 4/2012 | Bennett et al. | |
| 8,180,594 B2 | 5/2012 | Stephan | |
| 8,214,317 B2 | 7/2012 | Aguilar et al. | |
| 8,265,980 B2 | 9/2012 | Ochs et al. | |
| 8,468,601 B1 | 6/2013 | Bakhmutov | |
| 8,533,536 B2 | 9/2013 | Yan et al. | |
| 8,615,773 B2 | 12/2013 | Bishop et al. | |
| 2002/0004694 A1 | 1/2002 | Mcleod et al. | |
| 2002/0007237 A1 | 1/2002 | Phung et al. | |
| 2002/0023118 A1 | 2/2002 | Peled et al. | |
| 2002/0095597 A1 | 7/2002 | Norden et al. | |
| 2002/0133651 A1 | 9/2002 | Wang et al. | |
| 2004/0030649 A1 | 2/2004 | Nelson et al. | |
| 2004/0117791 A1 | 6/2004 | Prasad et al. | |
| 2005/0038581 A1 | 2/2005 | Kapolka et al. | |
| 2005/0060396 A1 | 3/2005 | Hirooka | |
| 2005/0211072 A1* | 9/2005 | Lu et al. | 84/612 |
| 2005/0246719 A1* | 11/2005 | Oshins et al. | 719/318 |
| 2006/0095394 A1 | 5/2006 | Miller et al. | |
| 2006/0200738 A1* | 9/2006 | Tarle et al. | 715/500 |
| 2007/0010923 A1 | 1/2007 | Rouyre | |
| 2007/0022403 A1 | 1/2007 | Brandt et al. | |
| 2007/0050719 A1 | 3/2007 | Lui et al. | |
| 2007/0100520 A1 | 5/2007 | Shah et al. | |
| 2007/0124189 A1 | 5/2007 | Stoughton et al. | |
| 2007/0226540 A1 | 9/2007 | Konieczny | |
| 2008/0059621 A1* | 3/2008 | Raghavan et al. | 709/223 |
| 2008/0098351 A1 | 4/2008 | Weatherhead et al. | |
| 2008/0119981 A1 | 5/2008 | Chen | |
| 2008/0125877 A1 | 5/2008 | Miller et al. | |
| 2008/0125933 A1 | 5/2008 | Williams et al. | |
| 2008/0163172 A1 | 7/2008 | Rossmann et al. | |
| 2008/0250118 A1* | 10/2008 | Ray | 709/219 |
| 2009/0113088 A1* | 4/2009 | Illowsky et al. | 710/62 |
| 2009/0138139 A1 | 5/2009 | Tsai et al. | |
| 2009/0138141 A1 | 5/2009 | Nwadiogbu et al. | |
| 2009/0228519 A1 | 9/2009 | Purcell et al. | |
| 2009/0249215 A1 | 10/2009 | Paek | |
| 2009/0265055 A1 | 10/2009 | Gillies | |
| 2009/0289756 A1 | 11/2009 | Raichle et al. | |
| 2009/0295559 A1 | 12/2009 | Howell et al. | |
| 2009/0300472 A1* | 12/2009 | Ambrosino et al. | 715/201 |
| 2010/0005470 A1 | 1/2010 | Simon et al. | |
| 2010/0010702 A1 | 1/2010 | Gilbert | |
| 2010/0042283 A1 | 2/2010 | Kell et al. | |
| 2010/0043003 A1 | 2/2010 | Valdez et al. | |
| 2010/0131241 A1 | 5/2010 | Dal Bello et al. | |
| 2010/0138515 A1* | 6/2010 | Ruiz-Velasco et al. | 709/217 |
| 2010/0192005 A1 | 7/2010 | Das et al. | |
| 2010/0217479 A1 | 8/2010 | Dahl et al. | |
| 2010/0217638 A1 | 8/2010 | Dickson et al. | |
| 2010/0229044 A1 | 9/2010 | Fountain et al. | |
| 2010/0281119 A1 | 11/2010 | Durai | |
| 2011/0010130 A1 | 1/2011 | Hadden et al. | |
| 2011/0023079 A1 | 1/2011 | Schultz et al. | |
| 2011/0060946 A1 | 3/2011 | Gupta et al. | |
| 2011/0077817 A1 | 3/2011 | Sun et al. | |
| 2011/0118905 A1 | 5/2011 | Mylaraswamy et al. | |
| 2011/0191099 A1 | 8/2011 | Farmaner et al. | |
| 2012/0023499 A1 | 1/2012 | Biran et al. | |
| 2012/0079005 A1 | 3/2012 | Dent et al. | |
| 2012/0150474 A1* | 6/2012 | Rentschler et al. | 702/117 |
| 2012/0151272 A1* | 6/2012 | Behrendt et al. | 714/39 |
| 2012/0158783 A1* | 6/2012 | Nice et al. | 707/776 |
| 2012/0198220 A1 | 8/2012 | Felke et al. | |
| 2012/0254876 A1 | 10/2012 | Bishop et al. | |
| 2012/0272099 A1 | 10/2012 | Keith, Jr. | |
| 2012/0304164 A1 | 11/2012 | van der Zweep et al. | |
| 2013/0023203 A1 | 1/2013 | Kakaire | |
| 2013/0073698 A1 | 3/2013 | Ling et al. | |
| 2013/0097414 A1 | 4/2013 | Bishop et al. | |
| 2013/0097459 A1 | 4/2013 | Bell et al. | |

OTHER PUBLICATIONS

USPTO Notice of Allowance for U.S. Appl. No. 13/016,601 dated Feb. 12, 2014.

USPTO Office Action for U.S. Appl. No. 13/477,735 dated Mar. 17, 2014.

EP Search Report for Application No. EP 13 184 653.7 dated Feb. 25, 2014.

USPTO Notice of Allowance for U.S. Appl. No. 13/077,276 dated Apr. 12, 2013.

USPTO Office Action for U.S. Appl. No. 13/115,690 dated Jun. 7, 2013.

Coalition Solutions Integrated, Inc.—Products & Services; Program Management / Information Technology (IT); URL: http://coalitionsolutions.com/products2.html; retrieved from the internet on Dec. 7, 2010.

Coalition Solutions Integrated, Inc.—Products & Services; Program Management / Information Technology (IT); http://coalitionsolutions.com/products2.html.

USPTO Office Action for U.S. Appl. No. 13/077,276 dated Feb. 8, 2013.

USPTO Office Action for U.S. Appl. No. 13/273,984 dated Nov. 4, 2013.

(56) References Cited

OTHER PUBLICATIONS

USPTO office action for U.S. Appl. No. 13/016,601 dated Nov. 8, 2013.
USPTO Notice of Allowance for 13/077,276 dated Oct. 17, 2013.
Bishop D.L, et al; Systems and Methods for Coordinating Computing Functions to Accomplish a Task, Filing date Jun. 14, 2013, U.S. Appl. No. 13/918,584.
EP Search Report dated Feb. 7, 2013 for EP 12 187 309.5.
EP Office Action dated Feb. 19, 2013 for EP 12 187 309.5.
Fletcher, et al.; Re-Configurable Multipurpose Digital Interface, Filed with the USPTO on Apr. 27, 2010 and assigned U.S. Appl. No. 12/768,448.
Fletcher, et al.; Re-Configurable Multipurpose Analog Interface, Filed with the USPTO on Mar. 30, 2010 and assigned U.S. Appl. No. 12/750,341.
Goldstein, et al.; Vehicle System Monitoring and Communications Architecture, Filed with the USPTO on Jun. 29, 2009 and assigned U.S. Appl. No. 12/493,750.
Felke, et al.; Methods and Reconfigurable Systems to Optimize the Performance of a Condition Based Health Maintenance System, Filed with the USPTO on Jan. 28, 2011 and assigned U.S. Appl. No. 13/016,601.
Bishop, et al.; Systems and Methods for Coordinating Computing Functions to Accomplish a Task, Filed with the USPTO on Mar. 31, 2011 and assigned U.S. Appl. No. 13/077,276.
Van Der Zweep, et al.; Systems and Methods to Configure Condition Based Health Maintenance Systems, Filed with the USPTO on May 25, 2011 and assigned U.S. Appl. No. 13/115,690.
Bell, et al.; Methods and Systems for Distributed Diagnostic Reasoning, Filed with the USPTO on Oct. 14, 2011, and assigned U.S. Appl. No. 13/273,984.
Bishop, et al.; Systems and Methods for Augmenting the Functionality of a Monitoring Node without Recompiling, Filed with the USPTO on May 22, 2012 and assigned U.S. Appl. No. 13/477,735.
USPTO Notice of Allowance, Notification Date May 13, 2014; U.S. Appl. No. 13/477,735.
USPTO Office Action, Notification Date Jun. 13, 2014; U.S. Appl. No. 13/115,690.

* cited by examiner

| EVENTS | COMPONENT | EVENT QUEUE | EVENT RESPONSE | COMPONENT | RESPONSE QUEUE | REQUIRED IN A BINARY |
|---|---|---|---|---|---|---|
| MESSAGE RECEIVED | ACQUIRE | ACQUIRE | PARSE MESSAGE | ACQUIRE | CRITICAL | X |
| MESSAGE PARSED | ACQUIRE | CORE | PROCESS MESSAGES | DECODE | CRITICAL | X |
| RECORD PROCESSING LOOP TO CAPTURE SNAPSHOT | | | | | | |
| SNAPSHOT AVAILABLE | RECORD | CORE | ANALYZE SNAPSHOT | ANALYZE | AYSNC | |
| SEND SNAPSHOT MESSAGE | | CORE | PREPARE SNAPSHOT DATA | COORDINATE | ASYNC | X |
| | COORDINATE | N/A | N/A — COMPLETED EVENT/RESPONSE CHAIN | N/A | N/A | |
| SNAPSHOT ANALYSIS COMPLETE | ANALYZE | N/A | NO RESPONSE | N/A | N/A | |
| | | CORE | ALLOCATE — WHEN SEAM IS AVAILABLE | ALLOCATE | AYSNC | |
| | | CORE | TRIGGER ANOTHER ANALYSIS LOOP | ANALYZE | AYSNC | |

FIG. 8

SYSTEMS AND METHODS FOR LIMITING USER CUSTOMIZATION OF TASK WORKFLOW IN A CONDITION BASED HEALTH MAINTENANCE SYSTEM

RELATED APPLICATIONS

The instant application contains subject matter related to subject matter disclosed in other co-owned, co-pending applications. As such, each of co-owned, co-pending application Ser. Nos. 13/016,601, 13/077,276 and 13/115,690 have been incorporated herein as references in their entirety.

TECHNICAL FIELD

The present invention generally relates to architectures for condition based health maintenance systems, and more particularly relates to systems and methods by which various combinations of computing functions may be operated in combination to accomplish a particular task within the condition based health maintenance system and methods by which a less knowledgeable user may customize the workflow for the task.

BACKGROUND

Increases in vehicle complexity and the accompanying increase in maintenance costs have led to industry wide investments into the area of condition based health maintenance (CBM). These efforts have led to the development of industry or equipment specific process solutions. However, conventional CBM systems are generally rigidly configured, which can result in cumbersome performance or users paying significant modification costs.

FIG. 1 is a simplified block diagram of an exemplary multi-level health maintenance process 10 that may be useful in monitoring a complex system (not shown). A complex system as discussed herein may be any type of vehicle, aircraft, manufacturing process, or machine that may utilize sensors, transducers or other data sources to monitor the various components and parameters of the complex system. The sensors/transducers are typically situated at the component or the process measurement level 20 to measure, collect and communicate raw data through a variety of data driven input/output (I/O) devices. This raw data may represent fault indicators, parametric values, process status and events, consumable usage and status, interactive data and the like. Non-limiting examples of other data sources may include serial data files, video data files, audio data files and built in test equipment.

Once the parameters of the complex system are measured, the measurement data is typically forwarded to more sophisticated devices and systems at an extraction level 30 of processing. At the extraction level 30, higher level data analysis and recording may occur such as the determination or derivation of trend and other symptom indicia.

Symptom indicia are further processed and communicated to an interpretation level 40 where an appropriately programmed computing device may diagnose, prognosticate default indications or track consumable usage and consumption. Raw material and other usage data may also be determined and tracked.

Data synthesized at the interpretation level 40 may then be compiled and organized by maintenance planning, analysis and coordination software applications at an action level 50 for reporting and other interactions with a variety of users at an interaction level 60.

Although processes required to implement a CBM system are becoming more widely known, the level of complexity of a CBM system remains high and the cost of developing these solutions is commensurately high. Attempts to produce an inexpensive common CBM solution that is independent from the design of the complex system that is being monitored have been less than satisfying. This is so because the combination and permutations of the ways in which a complex system can fail and the symptoms by which the failures are manifested are highly dependent on the system design.

Accordingly, it is desirable to develop a health maintenance system architecture that is sufficiently flexible to support a range of complex systems. In addition, it is desirable to develop a health maintenance system that may be easily reconfigured by a user in real time, thus dispensing with prohibitive reprogramming costs and delays. Furthermore, other desirable features and characteristics of the present invention will become apparent from the subsequent detailed description of the invention and the appended claims, taken in conjunction with the accompanying drawings and this background of the invention.

BRIEF SUMMARY

A computerized method is presented for customizing task workflow in a condition based health maintenance ("CBM") system computing node without recompiling software by using a data modeling tool program executing on a computer, the CBM computing node comprising a workflow service state machine and a static data store ("SDS"). The computerized method comprises identifying a first standardized executable application module ("SEAM") from a plurality of available SEAMs, wherein the first SEAM is configured to generate a first event associated with particular data being processed by the first SEAM and identifying a second SEAM from the plurality of available SEAMs, wherein the second SEAM is configured to generate a subsequent event associated with the particular data processed by the first SEAM. The method further comprises populating the CBM computing node with the first SEAM and the second SEAM, creating a quasi-state machine associating one or more unique responses to the first event and associating one or more unique responses to the subsequent event, and installing the quasi-state machine into the SDS of the computing node from which the workflow service state machine retrieves the one or more unique responses from the quasi-state machine to the first event for processing by the second SEAM to produce the subsequent second event for which the workflow service state machine retrieves the one or more unique responses from the quasi-state machine.

A reconfigurable system for monitoring the health of a complex system is presented. The reconfigurable system comprises a plurality of standardized executable application modules ("SEAM"), each SEAM containing instructions to perform one of a plurality of different standardized functions and a computing node arranged in a hierarchical structure comprising one or more layers of the computing nodes. The computing node includes a first SEAM and a second SEAM selected from the plurality of SEAMs, a workflow service state machine is configured to control the execution of the first SEAM. The first SEAM generates a first event associated with particular data being processed by the first SEAM and is configured to control the execution of the second SEAM. The second SEAM generates a subsequent event associated with the particular data processed by the first SEAM. The system further comprises a quasi-state machine, the quasi state machine configured to associate one or more unique responses to the first event and associate one or more unique responses to the subsequent event. The quasi-state machine resides in a static memory of the computing node from which the workflow service state machine retrieves the one or more unique responses to the first event for processing by the second SEAM to produce the subsequent second event for which the workflow service state machine retrieves the one or more unique responses from the quasi-state machine.

BRIEF DESCRIPTION OF THE DRAWINGS

The present invention will hereinafter be described in conjunction with the following drawing figures, wherein like numerals denote like elements.

FIG. 8 is a simplified event response table representing a quasi-state machine.

DETAILED DESCRIPTION

Figure 1:
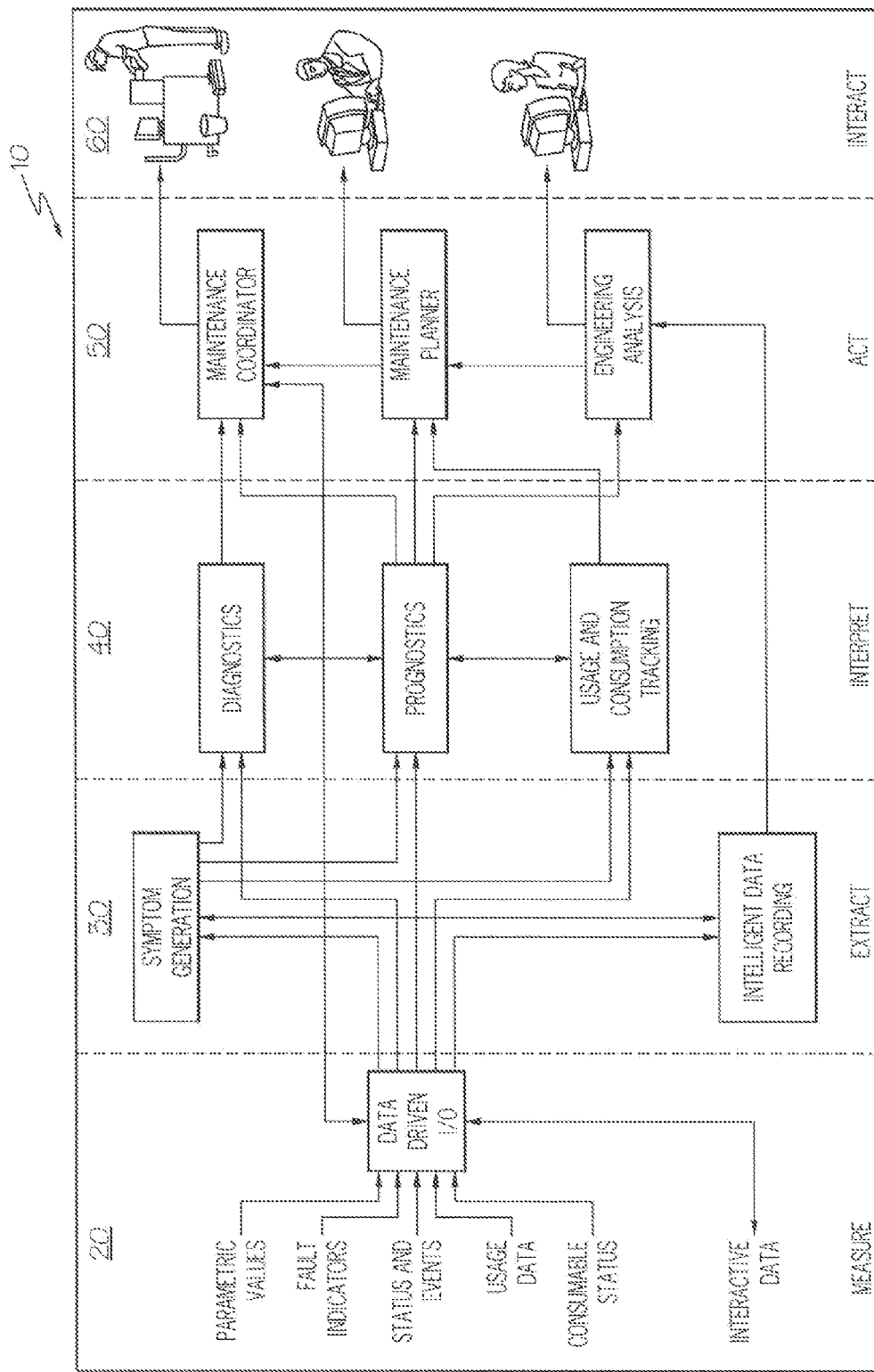
FIG. 1 is a simplified block diagram of a conventional multi-level health maintenance process.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware or computer software requiring a computing device for execution. Some of the embodiments and implementations are described below in terms of functional and/or logical block components (or modules) and various processing steps. However, it should be appreciated that such block components (or modules) may be realized by any number of hardware, and/or firmware components configured to perform the specified functions. To clearly illustrate this interchangeability of hardware and firmware, various illustrative components, blocks, modules, circuits, and steps are described herein generally in terms of their functionality. Whether such functionality is implemented as hardware or firmware depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a controller, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment will be presented in the following detailed description, it should be appreciated that a vast number of variations exist. It should also be appreciated that the exemplary embodiment or exemplary embodiments are only examples, and are not intended to limit the scope, applicability, or configuration of the invention in any way. Rather, the following detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Figure 2:
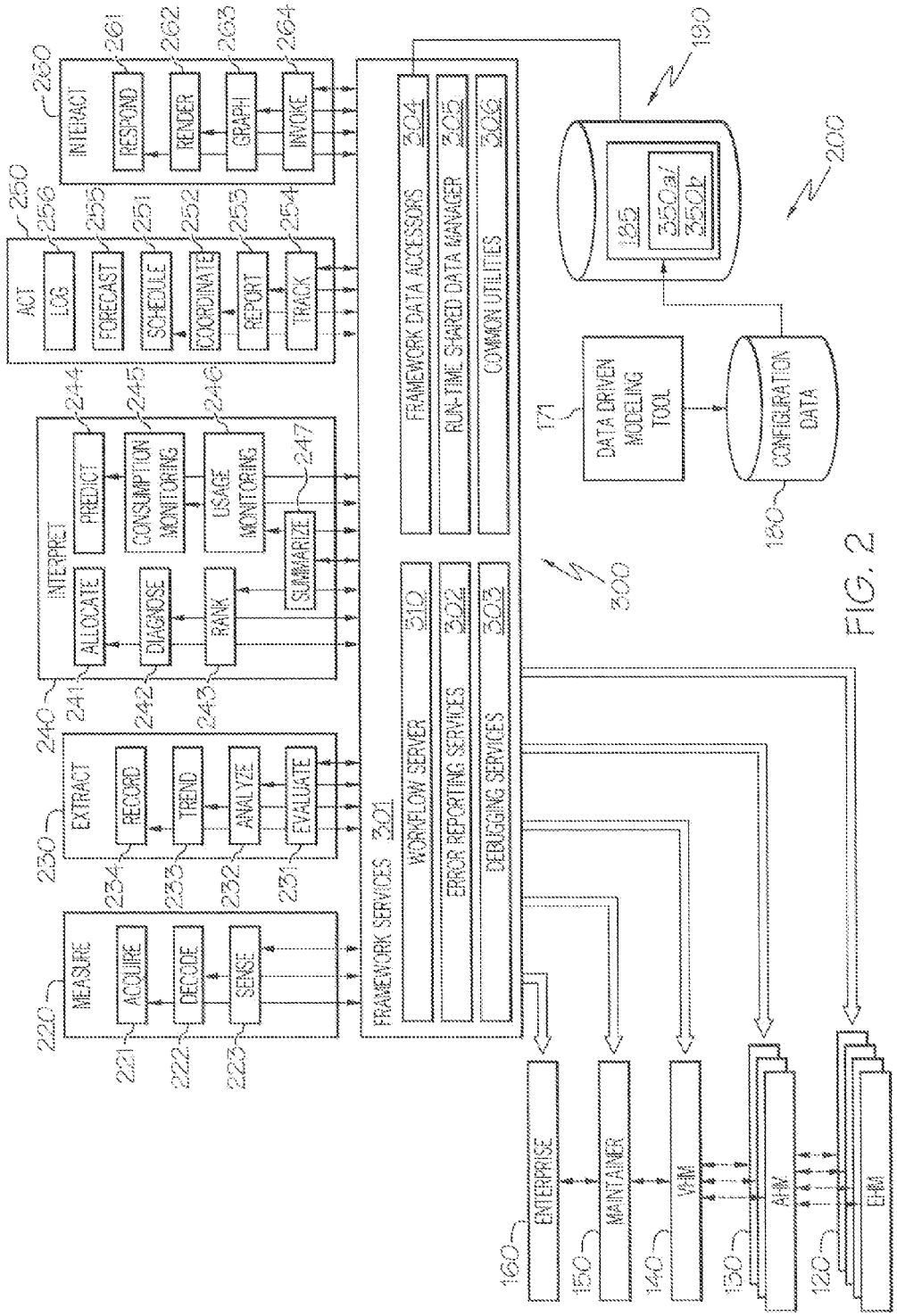
FIG. 2 is a simplified functional block diagram for embodiments of hierarchical structure.

FIG. 2 is a simplified functional block diagram for embodiments of a hierarchical structure 200 that may be timely reconfigured by the user. This may be accomplished by altering a set of configuration data 180 via a data driven modeling tool 171, which also may be described as a model based configuration means. The configuration data 180 may be stored in a static data store (e.g. a ROM), a dynamic data store (e.g. RAM), or both 190.

In light of the plethora of complex systems that may be monitored by the embodiments being described herein below and the wide range of functionality that may be desired at any point in the complex system, the following description contains non-limiting examples of the subject matter being disclosed herein. A specific non-limiting example of a complex system that may complement the following exemplary embodiments may be the vehicle as described in co-owned, co-pending application Ser. No. 12/493,750, which is assigned to the assignee of the instant application.

For the sake of brevity and simplicity, the present example will be assumed to have only five different processing levels or "application layers." An Application Layer (120'-160') is a set of functions or services programmed into run-time software resident in one or more computing nodes sharing a particular hierarchical level and which is adapted to meet the needs of a user concerning a particular health management implementation. As non-limiting examples, an application layer may be an Equipment Health Manager (EHM) Layer 120, an Area Health Manager (AHM) Layer 130, a Vehicle Heath Manager (VHM) Layer 140, a Maintainer Layer 150, or an Enterprise Layer 160.

However, in equivalent embodiments discussed herein, the hierarchical structure 200 may have any number of levels of application layers (120-160). Application layers (120-160) may include any number of computing nodes, which are computing devices. The number of nodes is determined by the complexity of the complex system and the sophistication of the monitoring desired by the user. In some embodiments, multiple nodes (120'-160') may be resident in one computing device. The computing nodes of the equipment based layers (EHM Layer 120, AHM Layer 130, VHM Layer 140, Maintainer layer 150 and Enterprise layer 160) may be also referred to as an EHM 120', an AHM 130', a VHM 140', a maintainer node 150' and an enterprise node 160'.

In the exemplary embodiments disclosed herein, an EHM 120' is a computing device that provides an integrated view of the status of a single component of the monitored assets comprising the lowest level of the hierarchical structure 200. The EHM 120' may have different nomenclature favored by others. For example, in equivalent embodiments the EHM 120' also be known as a Component Area Manager (CAM). A complex system may require a large number of EHMs (120'), each of which may include multiple times series generation sources such as sensors, transducers, Built-In-Test-Equipment (BITE) and the like. EHMs (120') are preferably located in electronic proximity to a time series data generation source in order to detect symptomatic times series patterns when they occur.

An AHM 130' is a computing device situated in the next higher hierarchical level of the hierarchical structure 200 and may receive and process message, command and data inputs received from a number of EHMs 120' and other nodes 130'-160'. An AHM 130' may report and receive commands and data from higher level or lower level components of the hierarchical structure 200. An AHM 130' processes data and provides an integrated view of the health of a single sub-system of the complex system being monitored. The AHM 130' may have different nomenclature favored by others. For example, in equivalent embodiments the AHM 130' also be known as a Sub-system Area Manager (SAM).

A VHM 140' is a computing device situated in the next higher hierarchical level for the hierarchical structure 200 and may receive and process message, command and data inputs received from a number of EHMs 120' and AHMs 130'. A VHM 140' may report and receive commands and data from higher level components of the hierarchical structure 200 as well. A VHM 140' processes data and provides an integrated view of the health of the entire complex system being monitored. The VHM 140' may have different nomenclature favored by others. For example, in equivalent embodiments the VHM 140' also be known as a system level control manager (SLCM).

A Maintainer Layer 150 contains one or more computing node (150') that analyze data received from the EHMs (120'), AHMs 130' and VHM(s) 140' and supports local field maintenance activities. Non-limiting examples of an Maintainer Level computing system is the Windows® PC ground based station (PC-GBS) software produced by Intelligent Automation Corporation a subsidiary of Honeywell International of Morristown, N.J.; or the US Army's Platform Soldier-Mission Readiness System (PS-MRS). The Maintainer Layer system may have different nomenclature favored by others. MNT nodes 150' also receive data, commands and messages from higher level nodes 160'.

An Enterprise Layer 160 contains one or more computing nodes (160') that analyze data received from the EHMs 120', AHMs 130', VHM(s) 140' and the Maintainer Layer 150. The Enterprise level supports the maintenance, logistics and operation of a multitude or fleet of assets. Non-limiting examples of an Enterprise Layer 160 computing system is the ZING™ system and the Predictive Trend Monitoring and Diagnostics System from Honeywell International. The Enterprise layer 160 may have different nomenclature favored by others.

In accordance with the precepts of the subject matter disclosed herein, each computing node (120'-160') of each level of the hierarchical structure 200 may be individually and timely configured or reconfigured by the user by way of the data driven modeling tool 171. The data driven modeling tool 171 allows a user to directly alter the configuration data 180, which in turn provides specific direction and data to, and/or initiates, one or more standardized executable application modules ("SEAMs") (221-264) resident in each computing node (120'-160') of the hierarchical structure 200 via the model driven GUI 170. In the following description the term "configure" and "provide specific direction and data" may be used synonymously.

The SEAMS (221-264) may be added, removed, ordered and reordered into sequences of SEAMs that accomplish specific tasks desired by the user. The number of SEAMs (221-264) is not limited and may be expanded beyond the number discussed herein. Similarly, the SEAMs (221-264)

discussed herein may be combined into fewer modules or broken down into component modules as may be required without departing from the scope of the disclosure herein. The SEAMs (221-264) are a set of run-time software that are selectable from one or more re-use libraries (220-260) and are subsequently directed to meet the health management implementation needs of a user. Each SEAM (221-264) contains modifiable executable code comprising a set of logic steps defining standardized subroutines designed to carry out a basic function that may be that can be reconfigured (i.e., directed and/or) redirected at a later time to carry out a specific functionality.

By adding SEAMS (221-264), events generated and responses acted upon by those SEAMs are added to one or more event/response tables 700 (See, FIG. 8). By deleting SEAMs from a node, events and responses are automatically deleted from the one or more event/response tables. The event/response tables may also be modified by specifically adding or otherwise modifying specific responses to a particular event within the event/response tables 700.

Sequences of SEAMS may also be referred to herein as "chains" of SEAMs. From the point of view of an end user, sequences of SEAMs or "chains," may be "fixed" chains or "variable" (i.e., alterable) chains. Variable chains may contain one or more fixed chains as an immutable segment of its otherwise variable sequencing.

Although it is conceivable that any of the SEAMs (221-264) may be included in fixed chain for some reason given the fathomless number of possible permutations and combination of SEAMs, for simplicity and brevity only those SEAMs identified below will be discussed as exemplary members of fixed SEAMs. A "fixed chain" of SEAMs is herein defined as a subset of SEAMs that are always found together in a fixed functional order, although other SEAMs may or may not be functionally located between the SEAMs comprising the fixed chain. Not only are the SEAMS in a fixed chain found in an immutable order, the events generated by the component SEAMs of fixed chains are not alterable using the data driven management tool 171. The events generated by a SEAM that is not in a fixed chain may be modified and increased.

There are 24 exemplary SEAMs (221-264) discussed herein that are selected from five non-limiting, exemplary libraries: a Measure Library 220, an Extract Library 230, an Interpret Library 240, an Act Library 250 and an Interact Library 260. The SEAMs (221-264) are basic un-modifiable modular software objects that are directed to complete specific tasks via the configuration data 180 after the SEAMs (221-264) are populated within the hierarchical structure 200. The configuration data 180 is implemented in conjunction with a SEAM (221-264) via the delivery to a node (120'-160') of a configuration file 185 containing the configuration data 180. Once configured, or reconfigured, the SEAMs (221-264) within the node may then cooperatively perform a specific set of functions on data collected from the complex system. A non-limiting example of a specific set of functions may be a health monitoring algorithm.

As non-limiting examples, the Measure Library 220 may include an Acquire SEAM 221, a Sense SEAM 223, and a Decode SEAM 222. The Acquire SEAM 221 functionality may provide a primary path for the input of data into a computing node (120'-160') through a customized adapter 325 (See, FIG. 3) which embodies external callable interfaces. The customized adapter 325 pushes blocks of data into the Acquire SEAM 221, which then parses the data block and queues it for subsequent processing by another executable application (222-264). For exemplary purposes, an Acquire SEAM will be considered herein as a potential member of a fixed chain.

The Sense SEAM 223 may provide a secondary path for the input of data into a computing node (120'-160') through a system initiated request to read data from a physical PO device (i.e. Serial data ports, Sensor I/O interfaces, etc.). The Sense SEAM 223, then parses the data block, and queues it for subsequent processing by another executable application (222-264).

The Decode SEAM 222 may take the data queued by the Acquire SEAM 221 or Sense SEAM 223 and translate the data into a useable form (i.e. symptoms and/or variables) that other executable applications can process. The Decode SEAM 222 may also fill a circular buffer with the data blocks queued by an Acquire SEAM 221 to enable snapshot or data logging functions. For exemplary purposes, a Decode SEAM will be considered herein as a potential member of a fixed chain.

The Extract Library 230 may include an Evaluate SEAM 231, a Record SEAM 234, an Analyze SEAM 232, a Trend SEAM 233 and a record SEAM 234. The Evaluate SEAM 231 may perform a periodic assessment of state variables of the complex system to trigger data collection, set inhibit conditions and detect complex system events based on real-time or near real-time data. For exemplary purposes, an Evaluate SEAM will be considered herein as a potential member of a fixed chain.

The Record SEAM 234 may evaluate decoded symptoms and variables to determine when snapshot/data logger functions are to be executed. If a snapshot/data log function has been triggered, the Record SEAM 234 may create specific snapshot/data logs and send them to a dynamic data store (DDS) 350b. The DDS 350b is a data storage location in a configuration file 185. Snapshots may be triggered by another executable application (221-264) or by an external system (not shown). For exemplary purposes, a Record SEAM will be considered herein as a potential member of a fixed chain.

The Analyze SEAM 232 may run one or more algorithms using the variable values and trend data that may have been assembled by the Trend SEAM 233 and subsequently stored in the dynamic data store (DDS) 350b to determine specific symptom states and/or provide estimates of unmeasured parameter values of interest.

The Interpret Library 240 may include an Allocate SEAM 241, a Diagnose SEAM 242, a Rank Seam 243, a Predict SEAM 244, A Consumption Monitoring SEAM 245, a Usage Monitoring SEAM 246, and a Summarize SEAM 247. The Allocate SEAM 241 may perform inhibit processing, cascade effect removal and time delay processing on a set of symptoms, and then allocate the symptoms to the appropriate fault condition(s) that is (are) specified for the monitored device or subsystem. The Allocate SEAM 241 may also update the state of each fault condition based on changes in the state of any particular symptom associated with a fault condition. For exemplary purposes, an Allocate SEAM will be considered herein as a potential member of a fixed chain.

The Diagnose SEAM 242 may orchestrate interaction between a system user, monitored assets and diagnostic reasoning to reduce the number of ambiguous failure modes for a given active fault condition until a maintenance procedure is identified that will resolve the root cause of the fault condition. For exemplary purposes, a Diagnose SEAM will be considered herein as a potential member of a fixed chain.

The Rank SEAM 243 may rank order potential failure modes after diagnostic reasoning has been completed. The failure modes, related corrective actions (CA) and relevant test procedures associated with a particular active fault condition are ranked according to pre-defined criteria stored in a Static Data Store (SDS) 350a. A SDS is a static data storage location in a configuration file 185 containing a persistent software object that relates an event to a pre-defined response. For exemplary purposes, a Rank SEAM will be considered herein as a potential member of a fixed chain.

The Predict SEAM 244 may run prognostic algorithms on trending data stored in the DDS 350b in order to determine potential future failures that may occur and provide a predictive time estimate.

The Consumption Monitoring SEAM 245 may monitor consumption indicators and/or may run prognostic algorithms on trending data stored in the DDS 350b that are configured to track the consumption of perishable/life-limited supply material in the complex system and then predict when resupply will be needed. The consumption monitoring functionality may be invoked by a workflow service module 310, which is a component functionality of an internal callable interface 300 and will be discussed further below.

The Usage Monitoring SEAM 246 may monitor trend data stored in the DDS 350b to track the usage of a monitored device or subsystem in order to estimate the need for preventative maintenance and other maintenance operations. The usage monitoring functionality may be invoked by the workflow service module 310, which is a component 261 functionality of the internal callable interface 300.

The Summarize SEAM 247 may fuse health data received from all subsystems monitored by an application layer and its subordinate layers (120-160) into a hierarchical set of asset status reports. Such reports may indicate physical or functional availability for use. The asset status reports may be displayed in a series of graphics or data trees on the GUI 170 that summarizes the hierarchical nature of the data in a manner that allows the user to drill down into the CBM layer by layer for more detail. The Summarize functionality may be invoked by the Workflow service module 310. This invocation may be triggered in response to an event that indicates that a diagnostic conclusion has been updated by another module of the plurality. The display of the asset status may be invoked by the user through the user interface. For exemplary purposes, a Summarize SEAM will be considered herein as a potential member of a fixed chain.

The Act Library 250 may include a Schedule SEAM 251, a Coordinate SEAM 252, a Report SEAM 253, a Track SEAM 254, a Forecast SEAM 255 and a Log SEAM 256. The Schedule SEAM 251 schedules the optimal time in which required or recommended maintenance actions (MA) should be performed in accordance with predefined criteria. Data used to evaluate the timing include specified priorities and the availability of required assets such as maintenance personnel, parts, tools, specialized maintenance equipment and the device/subsystem itself. Schedule functionality may be invoked by the workflow service module 310.

The Coordinate SEAM 252 coordinates the execution of actions and the reporting of the results of those actions between application layers 120-160 and between layers and their monitored devices/subsystems. Exemplary, non-limiting actions include initiating a BIT or a snapshot function. Actions may be pushed into and results may be pulled out of the Coordinate SEAM 252 using a customized adapter 325a-e which embodies an external callable interface. The customized adapter 325a-e may be symmetric such that the same communications protocol may be used when communicating up the hierarchy as when communicating down the hierarchy.

The Report SEAM 253 may generate a specified data block to be sent to the next higher application in the hierarchy and/or to an external user. Report data may be pulled from the Report SEAM 253 by the customized adapter 325a-e. The Report SEAM 253 may generate data that includes a health status summary of the monitored asset.

The Track SEAM 254 may interact with the user to display actions for which the user is assigned and to allow work to be accomplished or reassigned.

The Forecast SEAM 255 may determine the need for materials, labor, facilities and other resources in order to support the optimization of logistic services. Forecast functionality may be invoked by the Workflow service module 310.

The Log SEAM 256 may maintain journals of selected data items and how the data items had been determined over a selected time period. Logging may be performed for any desired data item. Non-limiting examples include maintenance actions, reported faults, events and the like.

The Interact Library 260 may include a Render SEAM 262, a Respond SEAM 261, a Graph SEAM 263, and an Invoke SEAM 264. The Render SEAM 262 may construct reports, tabularized data, structured data and HTML pages for display, export or delivery to the user.

The Respond SEAM 261 may render data for display to the user describing the overall health of the complex system and to support detailed views to allow "drill down" for display of summary evidence, recommended actions and dialogs. The rendering of display data may be initiated by the Workflow service module 310; but, the data may be pulled from the Render SEAM 262 via the callable interface 300. The Respond SEAM 261 may also receive and process commands from the user via the specialized adapter 325 then route the commands to the appropriate module in the appropriate node for execution and processing. The commands may be pushed into the Respond Module via the callable interface 300.

The Graph SEAM 263 may provide graphical data for use by the Render SEAM 262 in the user displays on GUI 170. The graphical data may include the static content of snapshot and trend files or may dynamically update the content of the data in the circular buffer.

The Invoke SEAM 264 may retrieve documents to be displayed to a maintainer or interacts with an external document server system (not shown) to cause externally managed documents to be imported and displayed.

To reiterate, each of the SEAMs (221-264) discussed above are never modified. The SEAMs (221-264) are loaded into any computing node (120'-160') of the hierarchical structure 200 and any number of SEAMs may be loaded into a single node. Once installed, each standard executable application module (221-264) may be initialized, directed and redirected by a user by changing the configuration data 180 resident in the database 190 to perform specific tasks in regard to its host computing device or platform.

Communication between SEAMs (221-264) within a node is facilitated by a callable interface 300. A callable interface 300 is resident in each computing node (120'-160') of the hierarchical structure 200. The callable interface 300 may have several sub-modules (302-310) that may be co-resident in a single computing device of a computing node (120'-160'). Exemplary sub-modules of the callable interface 300 may include a framework executive 301 as a component of the callable interface 300, a workflow service module 310, an error reporting server 302, a debugging server 303, a framework data accessor, a run-time shared data manager 305 and common utilities 306. Those of ordinary skill in the art will recognize that in equivalent embodiments a "module," "a sub-module," "a server," or "a service" may comprise software, hardware, firmware or a combination thereof.

The framework executive 301 of a computing node provides functions that integrate the nodes within the hierarchical structure 200. The framework executive 301 in conjunction with the configuration files 185 coordinate initialization of each node including the SEAMs (221-264) and the other service modules 301-310 allowing the execution of functions that are not triggered by a customized adapter 325 (discussed further below). In some embodiments, the computing nodes in all application layers may have a framework executive 301. In other embodiments, nodes in most application layers except, for example, an EHM Layer 120 will have a framework executive 301. In such embodiments, the computing nodes 120' in the EHM layer 120 may rely on its host platform (i.e. computing device) operating software to perform the functions of the framework executive.

Error reporting services 302 provide functions for reporting run-time errors in a node (120-160) within the hierarchical structure 200. The error reporting server 302 converts application errors into symptoms that are then processed as any other failure symptom, reports application errors to a debugging server 303 and reports application errors to a persistent data manager (not shown).

Debugging services 303 collects and reports debugging status of an executable application module (221-264) during testing, integration, certification, or advanced maintenance services. This server may allow the user to set values for variables in the DDS 350*b* and to assert workflow events.

The framework data accessor 304 provides read access to the SDS 350*a* and read/write access to the DDS 350*b* (each stored in a memory 190) by the SEAMs (221-264) in a computing node (120'-160'). Write access to the SDS 350*a* is accomplished via the data modeling tool 171, which includes GUI 170.

The run-time shared data manager 305 manages all node in-memory run-time perishable data structures that are shared between SEAMs (221-264) that are not stored in the DDS 350*b*, but does not include cached static data. As non-limiting examples of perishable data structures may include I/O queues and circular buffers.

Common utilities 306 may include common message encoding/decoding, time-stamping and expression evaluation functions for use by the SEAMs (221-264) installed in a computing node.

The work flow service module 310 is a standard set of logic instructions that enable a data-driven flow of tasks within a computing node to be executed by the various SEAMs (221-264) within the node. The workflow service module 310 acts as a communication control point within the computing node where all communications related to program execution to or from one executable application module (221-264) are directed through the node's workflow service module 310. Stated differently, the workflow service module 310 of a node (120'-160') orchestrates the work flow sequence among the various SEAMs (221-264) and an event-response table 361 included in the SDS 350*a* that happens to reside in the node. In some embodiments the workflow service module 310 may be a state machine.

Figure 3:
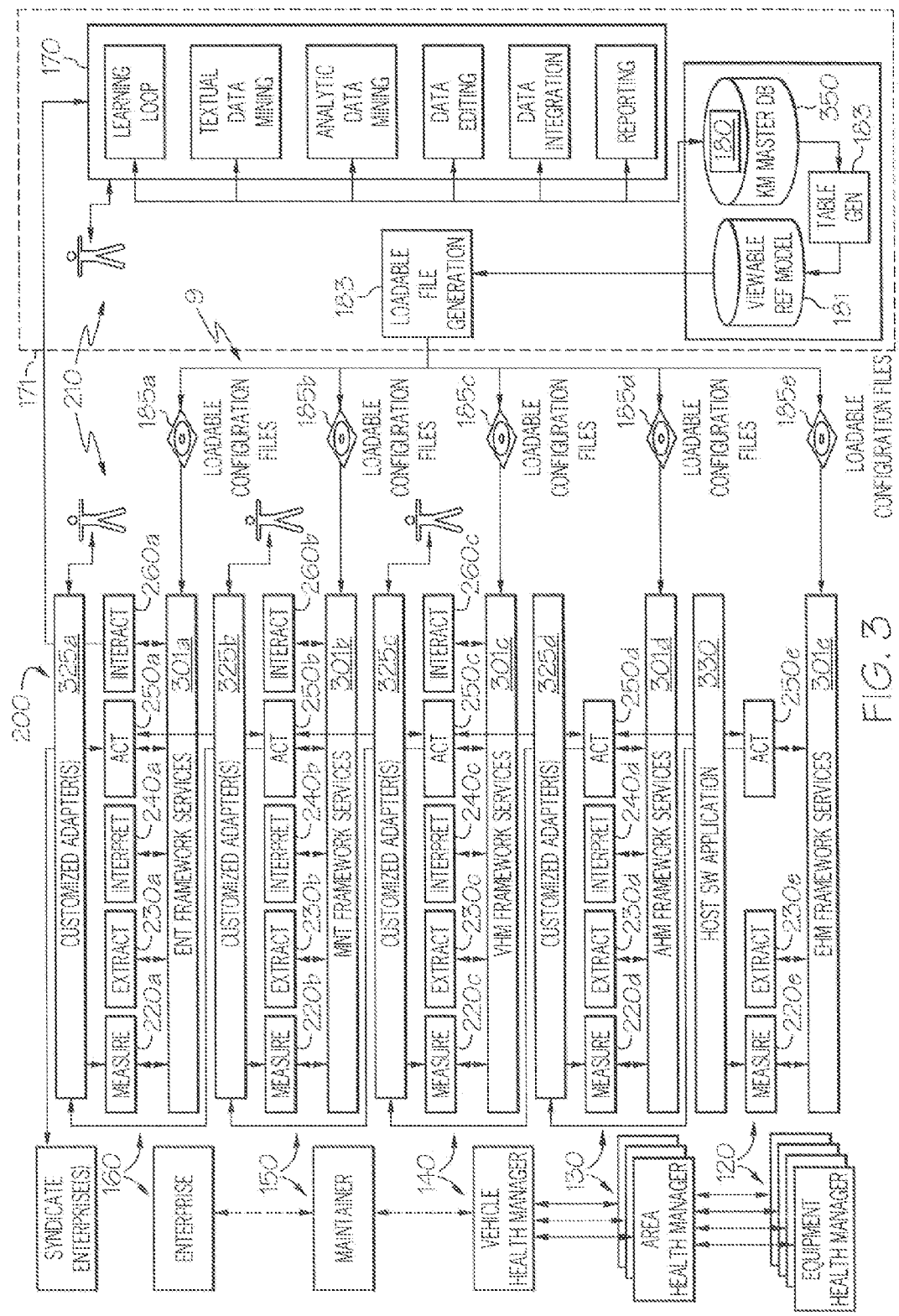
FIG. 3 is a simplified schematic of an exemplary reconfigurable system to optimize run time performance of a hierarchical condition based maintenance system.

FIG. 3 is a simplified, exemplary schematic of a configured hierarchical structure 200 that may optimize the run time performance of the hierarchical structure 200. The exemplary embodiment of FIG. 3 features a hierarchical structure 200 comprising five exemplary hierarchical layers (120-160), although in other embodiments the number of hierarchical layers may range from a single layer to any number of layers. Each hierarchical layer (120-160) includes one or more nodes (120'-160') containing SEAMs (221-264) that were copied and loaded from one of the reusable libraries (220-260) into a computing node (120'-160') in the layer. Each SEAM (221-264) may be configured by a user 210 by modifying its respective loadable configuration file 185. The loadable configuration file 185 is constructed using the data driven modeling tool 171.

For the sake of simplicity, the SEAMs (221-264) may be discussed below in terms of their respective libraries. The number of combinations and permutations of executable applications (221-264) is large and renders a discussion using specific SEAMs unnecessarily cumbersome.

At an EHM layer 120, there may be a number of EHM nodes 120', each being operated by a particular host computing device that is coupled to one or more sensors and/or actuators (not shown) of a particular component of the complex system. As a non-limiting example, the component of the complex system may be a roller bearing that is monitored by a temperature sensor, a vibration sensor, a built-in-test, sensor and a tachometer, each sensor being communicatively coupled to the computing device (i.e. a node). As a non-limiting example, the host computing device of an EHM 120' of the complex system may be a computer driven component area manager ("CAM") (i.e. a node). For a non-limiting example of a CAM that may be suitable for use as EHM nodes, see co-owned, co-pending U.S. patent application Ser. No. 12/493,750.

Each EHM (120') host computing device in this example is operated by a host software application 330. The host executive software 330 may be a proprietary program, a custom designed program or an off-the-shelf program. In addition to operating the host device, the host software application also may support any and all of the SEAMs (221-264) via the framework services 301 by acting as a communication interface means between EHMs 120' and between EHMs 120' and other nodes located in the higher levels.

The exemplary embodiment of FIG. 3 illustrates that the host executive software 330 of an EHM 120' may host (i.e. cooperate) one or more SEAMs 220*e* from the Measure Library 220, one or more SEAMs 230*e* from the Extract Library 230 and one or more SEAMs 250*e* from the Act Library 250. The SEAMs 220*e*, 230*e*, and 250*e* are identical to their counterpart application modules that may reside in any another node in any other level in the hierarchical structure 200. Only when directed by the configuration file 185*e*, will a SEAM(s) (221-264) differ in performance from its counterpart module that has been configured for and is a resident in another node in the hierarchical structure 200. Once configured/directed, a standardized executable application (221-264) becomes a special purpose executable application module.

At an AHM level 130, there may be a number of AHM nodes 130'. Each AHM node is associated with a particular host computing device that may be coupled to one or more sensors and/or actuators of a particular component(s) or a subsystem of the complex system and are in operable communication with other AHM nodes 130', with various EHM nodes 120' and with higher level nodes (e.g., see 501, 502, 601 and 602 in FIGS. 5-6). As a non-limiting example, the host computing device of an AHM of the complex system may be a computer driven sub-system area manager ("SAM") (i.e. a node) operating under its own operating system (not shown). For non-limiting examples of a SAM that may be suitable for use as an AHM node, see co-owned, co-pending patent application Ser. No. 12/493,750.

The exemplary AHM node 130' of FIG. 3 illustrates that the AHM 130' has an additional interpret functionality 240*d* that in this example has not been configured into the EHM 120'. This is not to say that the EHM 120' cannot accept or execute a function from the Interpret library 240, but that the system user 210 has chosen not to populate the EHM node 120' with that general functionality. On the other hand, the AHM node 130' software hosts one or more SEAMs 220*d* from the Measure Library 220, one or more SEAMs 230*d* from the Extract Library 230 and one or more SEAMs 250*d* from the Act Library 250. In their unconfigured or undirected state, the SEAMs 220*d*, 230*d*, and 250*d* are identical to their counterpart application modules that may reside in any another node in any other level in the hierarchical structure 200.

Unlike the exemplary EHM node 120', the exemplary AHM node 130' may include a different communication interface means such as the customized adapter 325*d*. A customized adapter 325 is a set of services, run-time software, hardware and software tools that are not associated with any of the SEAMs (221-264). The customized adapters 325 are configured to bridge any communication or implementation gap between the hierarchical CBM system software and the computing device operating software, such as the host application software (not shown). Each computing node (120'-160') may be operated by its own operating system, which is its host application software. For the sake of clarity, FIG. 3 shows only the host executive software 330 for the EHM 120'. However, host application software exists in all computing nodes (120'-160').

In particular the customized adapters 325 provide symmetric communication interfaces (e.g., communication protocols) between computing nodes and between computing nodes of different levels. The customized adapter 325 *a-d* allow for the use of a common communication protocol throughout the hierarchical structure 200 from the lowest EHM layer 120 to the highest enterprise layer 160 as well as with the memory 190.

At a VHM layer 140, there may be a number of VHM nodes 140', each VHM node is associated with a particular host computing device that may be in operative communication with one or more sensors and/or actuators of a particular component(s) of the complex system via an EHM 120' or to subsystems of the complex system and that are in operable communication via their respective AHMs 130'. As a non-limiting example, the VHM 140' may be a computer driven system level control manager ("SLCM") (i.e. also a node). For non-limiting examples of a SLCM that may be suitable for use as a VHM node, see co-owned, co-pending patent application Ser. No. 12/493,750.

In the exemplary hierarchical structure 200 there may be only one VHM 140', which may be associated with any number of AHM 130' and EHM 120' nodes monitoring a subsystems of the complex system. In other embodiments, there may more than one VHM 140' resident within the complex system. As a non-limiting example, the complex system may be a fleet of trucks with one VHM 140' in each truck that communicates with several EHMs 120' and with several AHMs 130' in each truck. Each group of EHMs 120' and AHMs 130' in a truck may also be disposed in a hierarchical structure 200

FIG. 3 further illustrates that the exemplary VHM 140' has an additional Interact functionality 260*c* that has not been loaded into the EHM 120' or into the AHM 130'. This is not to say that these lower level nodes cannot accept or execute an Interact function 260, but that the system user 210 has chosen not to populate the lower level nodes with that functionality. On the other hand, for example, the host software of VHM 140' hosts one or more SEAMs 220*c* from the Measure Library 220, one or more SEAMs 230*c* from the Extract Library 230, one or more SEAMs 240*c* from the Interpret Library 240 and one or more SEAMs 250*c* from the Act Library 250. The executable applications from the Interact library allow the system user 210 to access the VHM 140' directly and to view the direction thereof via the GUI 170. In their undirected state, the SEAMs 220*c*, 230*c*, 240*c* and 250*c* are identical to their counterpart application modules that may reside in any another node in any other level in the hierarchical structure 200. The standardized executable applications 220*c*-260*c* are directed to carry out specific functions via configuration files 185*c*.

Like the exemplary AHM node 130', an exemplary VHM node 140' includes a customized adapter 325*c*. The customized adapter 325*c* is also configured to bridge any communication or implementation gap between the hierarchical system software and the computing device operating software operating within VHM 140'.

At the Maintainer (MNT) layer 150, there may be a number of MNT nodes 150', each MNT node is associated with a particular host computing device that may be in operative communication with one or more sensors and/or actuators of a particular component(s) of the complex system via an EHM 120', to subsystems of the complex system and that are in operable communication via their respective AHM 130', and to the VHMs 140'. As a non-limiting example, the MNT node 150' may be a laptop computer in wired or wireless communication with the communication system 9 of the hierarchical structure 200.

FIG. 3 illustrates that the exemplary MNT node 150' may have the functionality of some or all of the executable applications (221-264). This is not to say that these lower level nodes cannot accept or execute any of the executable applications (221-264), but that the system user 210 has chosen not to populate the lower level nodes with that functionality. Like the exemplary VHM 140' the executable application(s) 260*b* from the Interact library allow the system user 210 to access the Maintainer node 150' directly and may view the direction thereof via the GUI 170. In their undirected state, the SEAMs 220*b*, 230*b*, 240*b* and 250*b* are identical to their standard counterpart application modules that may reside in any another node in any other level in the hierarchical structure 200. The executable applications 220*b*-260*b* are directed to carry out specific functions via configuration files 185*b*.

Like the exemplary AHM node 130' and VHM node 140', the MNT node 150' includes a customized adapter 325*b*. The customized adapter is also configured to bridge any communication implementation gap between the hierarchical system software and the computing device operating software operating within the various nodes of the hierarchical structure 200.

At the Enterprise (ENT) layer 160, there may be a number of ENT nodes 160', each ENT node is associated with a particular host computing device that may be in operative communication with one or more sensors and/or actuators of a particular component(s) of the complex system via an EHM 120', to subsystems of the complex system and that are in operable communication via their respective AHM modules 130' and the VHMs 140', as well the MNT nodes 150'. As a non-limiting example, the ENT node 160' may be a general purpose computer that is in wired or wireless communication with the communication system 9 of the hierarchical structure 200.

FIG. 3 also illustrates that the ENT node 160' may have the functionality of some or all of the executable applications (221-264) as selected and configured by the user. Like the exemplary VHM node 140', the executable application(s) 260*a* from the Interact library allow the system user 210 to access the ENT node 160' node directly via the GUI 170. In their undirected state, the SEAMs 220a, 230a, 240a and 250a are identical to their undirected counterpart application modules (221-264) that may reside in any another node in any other level in the hierarchical structure 200. The executable applications 220a-260a are configured/directed to carry out specific functions via configuration files 185a.

Like the exemplary AHM node 130', VHM node 140' and the MNT node 150', the ENT node 160' includes a customized adapter 325a. The customized adapter 325a is also configured to bridge any communication or implementation gap between the hierarchical system software and the host computing device software operating within the ENT node.

In various embodiments, none of the computing nodes (120'-160') are able to communicate directly with one another. Hence, all computing nodes (120'-160') communicate via the customized adapters (325). In other embodiments, most computing nodes 120'-160' may communicate via the customized adapters (325). For example, an exception may be an EHM 120', which may communicate via its host executive software 330.

A customized adapter 325 is a component of the host executive software 330 and is controlled by that host software. The customized adapter 325 provides an interface between the host executive software 330 and the SEAMs (221-264). The workflow service module 310 will invoke one or more of the SEAMs (221-264) and services (302, 303, 306) to make data available to the customized adapter 325, which places data from a node onto a data bus of the communication system 9 and pulls data from the bus for use by one of the SEAMs (221-264). For example, the Acquire SEAM 221 may receive data from the customized adapter 325, or the Report SEAM 253 may produce data to be placed on the bus by the customized adapter.

The communication system 9 may be any suitable wired or wireless communications means known in the art or that may be developed in the future. Exemplary, non-limiting communications means includes a CANbus, an Ethernet bus, a firewire bus, spacewire bus, an intranet, the Internet, a cellular telephone network, a packet switched telephone network, and the like.

The use of a universal input/output front end interface (not shown) may be included in each computing node (120'-160') as a customized adapter 325 or in addition to a customized adapter 325. The use of a universal input/output (I/O) front end interface makes each node behind the interface agnostic to the communications system by which it is communicating. Examples of universal I/O interfaces may be found in co-owned application Ser. Nos. 12/750,341 and 12/768,448, and are examples of communication interface means.

The various computing nodes (120'-160') of the hierarchical structure 200 may be populated using a number of methods known in the art, the discussion of which is outside the scope of this disclosure. However, exemplary methods include transferring and installing the pre-identified, pre-selected standardized executable applications to one or more data loaders of the complex system via a disk or other memory device such as a flash drive. Other methods include downloading and installing the executable applications directly from a remote computer over a wired or wireless network using the complex system model 181, the table generator 183 and the GUI 170.

The data modeling tool 171, table generator 183 and the GUI 170 may be driven by, or be a subsystem of any suitable HMS computer system known in the art. A non-limiting example of such an HMS system is the Knowledge Maintenance System used by Honeywell International of Morristown N.J. and is a non-limiting example of a model based configuration means. The data modeling tool 171 allows a subject matter expert to model their hierarchical structure 200 as to inputs, outputs, interfaces, errors, etc. The table generator 283 then condenses the system model information into a compact dataset that at runtime configures or directs the functionality of the various SEAMs (221-264) of hierarchical structure 200.

Figure 4:
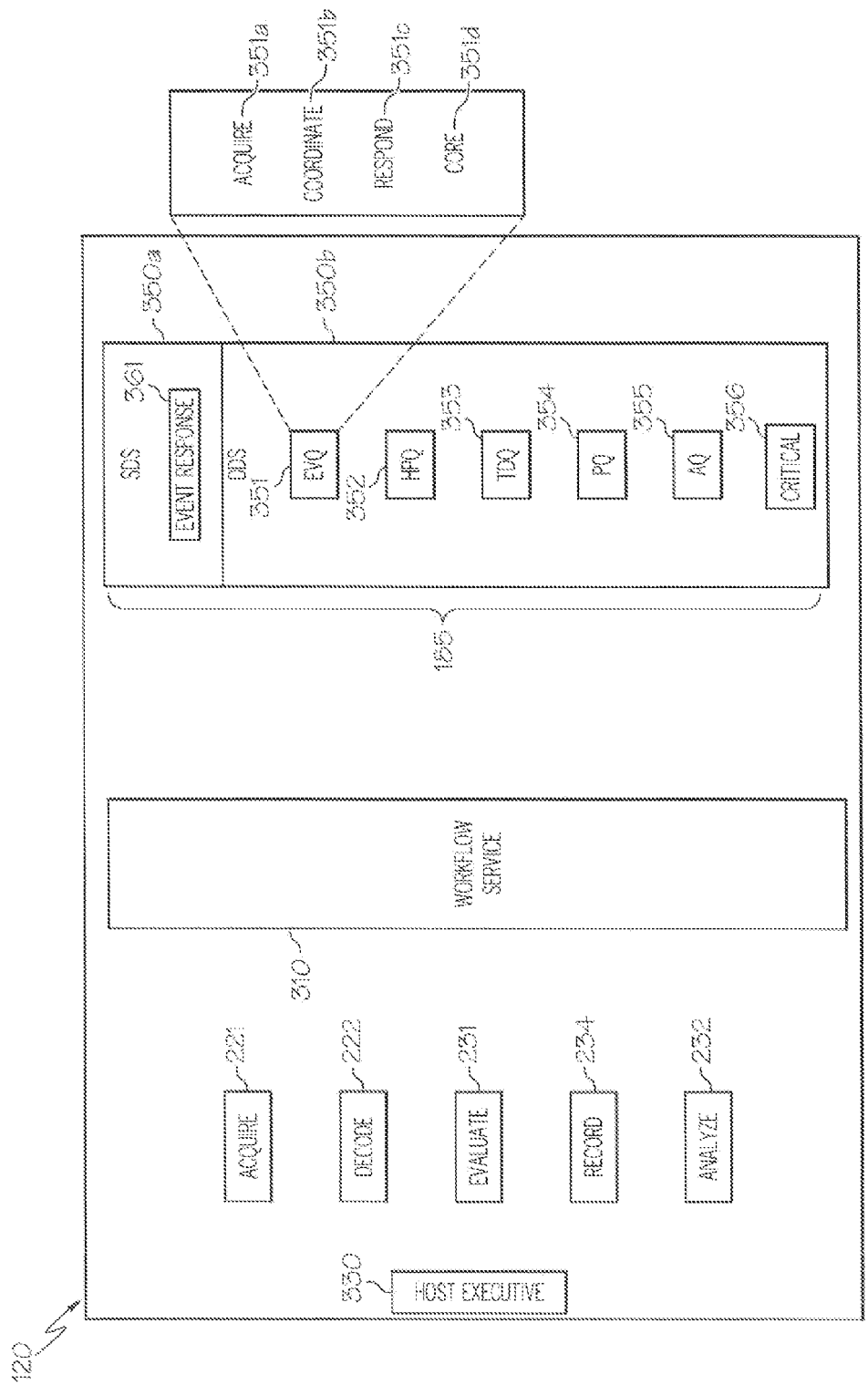
FIGS. 4 and 5 are simplified block diagrams of an exemplary computing node, such as an EHM, according to embodiments.
Figure 5:
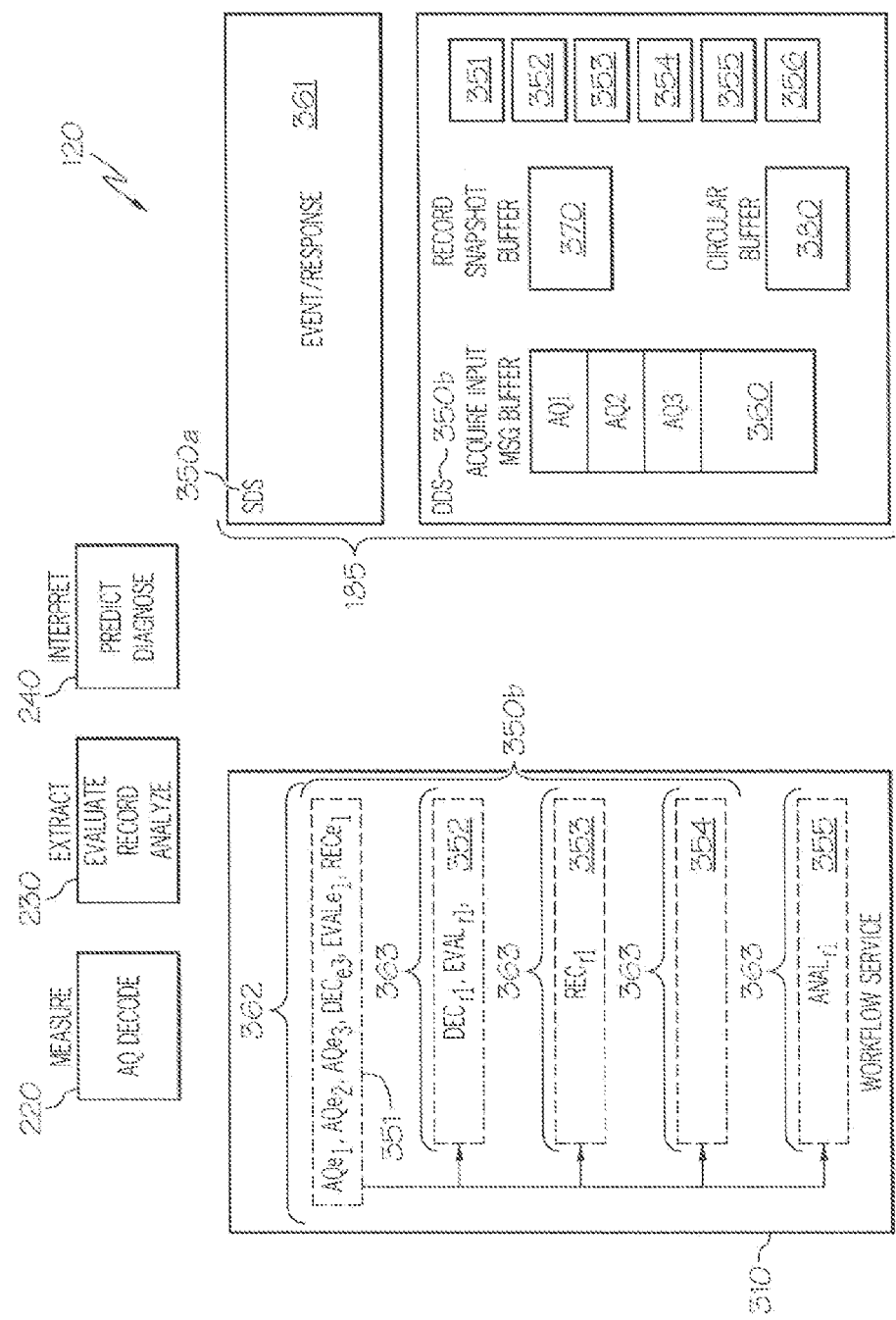
Figure 6A:
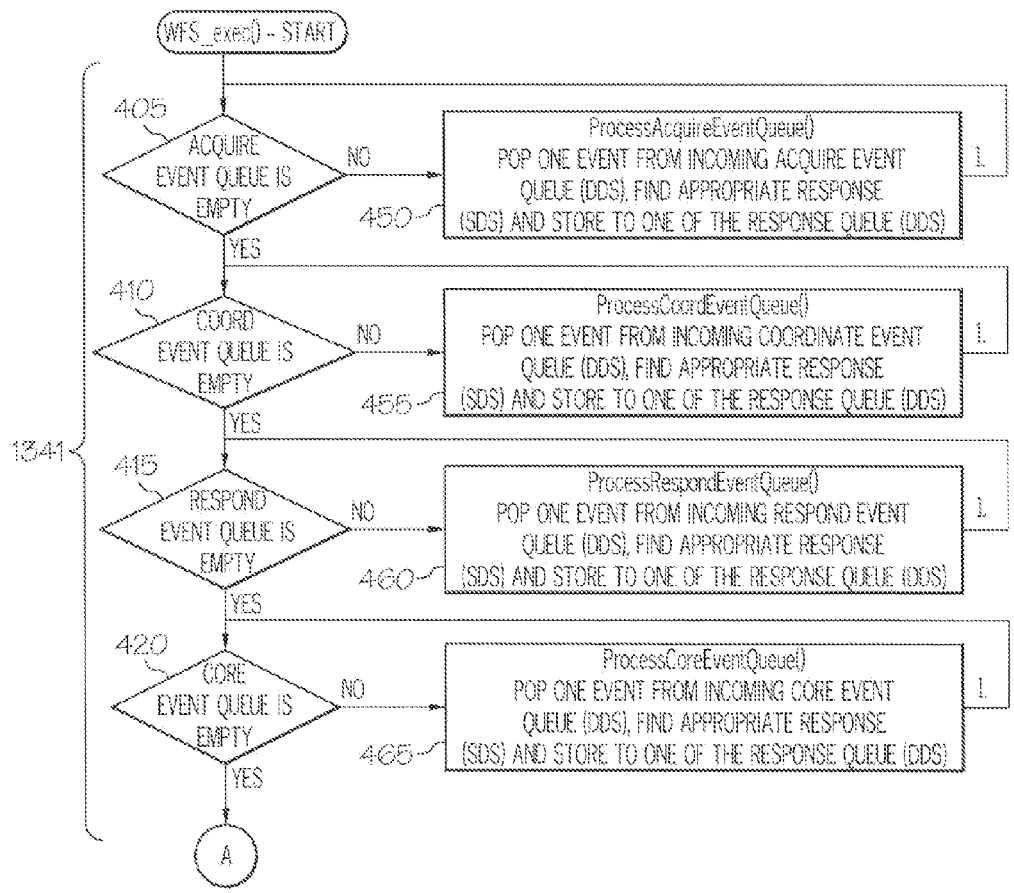
FIGS. 6A and 6B are a simplified logic flow diagram of an exemplary method for coordinating functions of a computing device to accomplish a task according to embodiments.
Figure 6B:
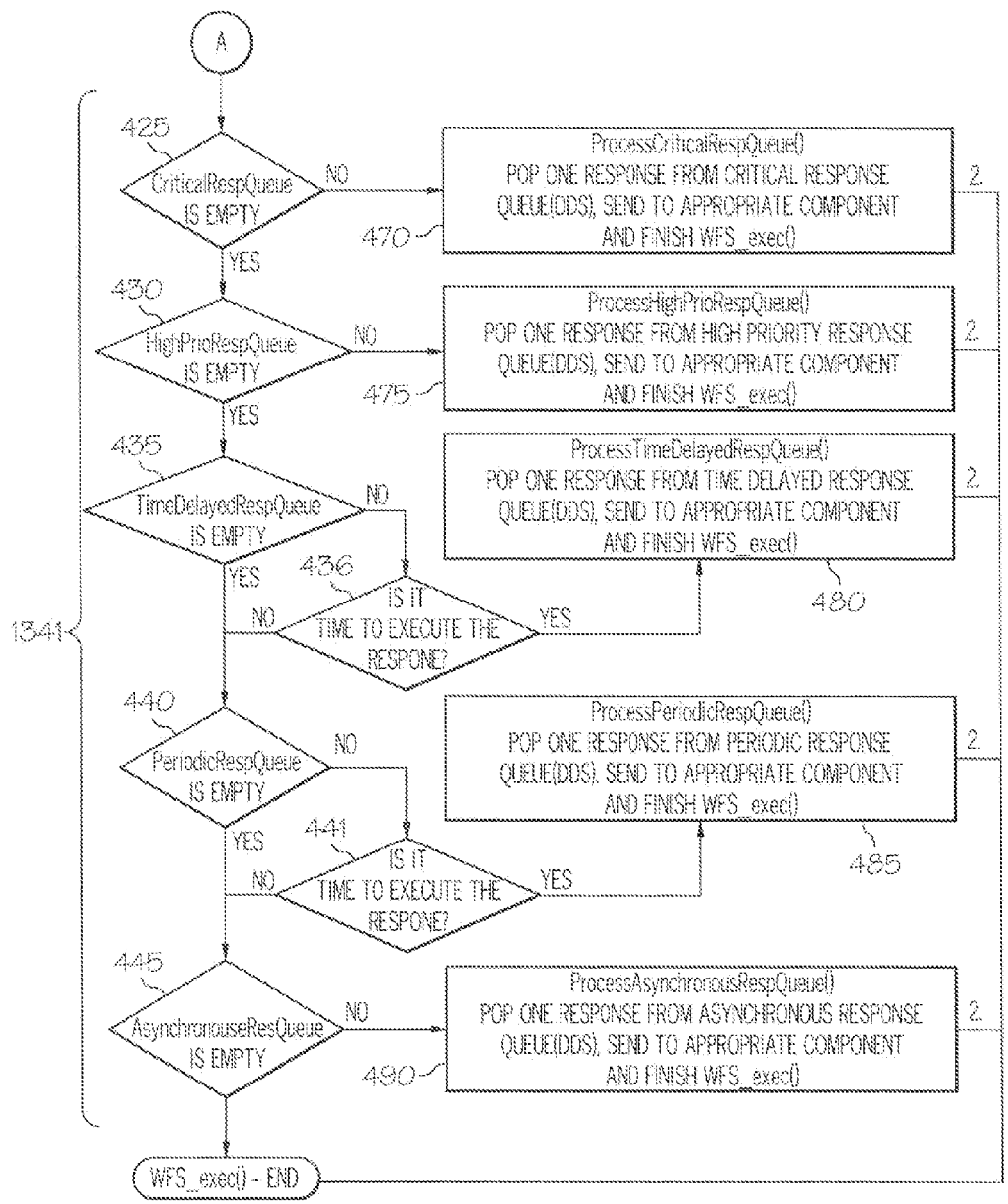

FIGS. 4 and 5 are simplified block diagrams of an exemplary computing node (120'-160'), which here happens to be an EHM 120'. Each computing node (120'-160') utilizes its own host executive software 330. The host executive software 330 executes the normal operating functions of the host EHM 120', but may also provide a platform for hosting the health maintenance functions residing in any SEAM (221-264) populating the computing node.

As described above, there are 24 SEAMs (221-264) disclosed herein. However, other SEAMs with additional functionalities may be included. As such, any discussion herein is intended to extend to any SEAMs that may be created in the future. However, in the interest of brevity and clarity of the following discussion, the number of SEAMs (221-264) has been limited to an Acquire SEAM 221, a Decode SEAM 222, Evaluate SEAM 231, a Record SEAM 234 and an Analyze SEAM 232 as these SEAMs may be viewed as providing some basic functionality common to each SEAM resident in each computing node (120'-160') of the hierarchy.

For those skilled in the art of computer programming and health maintenance systems, any available SEAMs resident in the libraries 220-260, may be utilized, combined, associated or chained together to accomplish a specific task including chains of SEAMs that are repeated often and enable certain basic functionality, such as receiving/acquiring data at a node. However, the economic value of a CBM health monitoring system is limited if customer technicians are unable to customize the CBM health maintenance system efficiently without inadvertently degrading operational efficiency of basic or "core" functionality.

For example, receiving data, translating data into a suitable format and the evaluation of that data for further processing is a standardized process chain of events that does not change from application to application. Hence, system designers may create one or more "fixed" chains of SEAMs that are commonly and invariably sequenced together in the same order to effectuate core functionality. As such, the user may customize the CBM health maintenance system to accomplish higher level tasks by employing fixed chains of SEAMS as a unit, or a virtual subroutine, that performs the same operations every time the chain of events-responses is encountered.

One such fixed chain of SEAMS may be an Acquire-Decode-Evaluate-Record chain (an "ADER" chain), the component SEAMs of which always are found together in the same fixed order and execute the same functionality albeit for different purposes. An ADER SEAM processes its Acquire, Coordinate and Respond Events via the priority event queues (351a-c). As described above, the Acquire SEAM receives data into the node (120'-160'). The Decode SEAM transforms the data into a suitable format for processing and the Evaluate SEAM checks data for specific conditions and invokes an appropriate action/response. Another such fixed chain may be the Allocate-Rank-Diagnose-Summarize chain (an "ARDS" chain). An ARDS chain is an example of a fixed chain that processes all of it events via the Core Event Queue 356 and places its responses into the asynchronous response queue 355.

In addition to the SEAMs (221-264), each computing node (120'-160') also includes a configuration file 185 and a workflow service module 310. The configuration file 185 comprises the DDS 350b and the SDS 350a.

Among other data structures, the DDS 350b may comprise an Event Queue (EVQ) 351, Critical Response Queue (CQ) 356, a High Priority Response Queue (HPQ) 352, a Time Delayed Response Queue (TDQ) 353, a Periodic Response Queue (PQ) 354, and an Asynchronous Response Queue (AQ) 355. However, it will be appreciated by those of ordinary skill in the art that the number of queues, their categorization and their priority may be defined and redefined to meet the requirements of a particular application.

For example, in order to ensure that certain SEAMs that receive data from other nodes (120'-160') (i.e., from external sources) via a specialized adapter 325 do not "step on," or corrupt data associated with other priority events already in the EVQ 351 or being executed by the workflow server 310, the EVQ 351 may be segregated into, or replaced by discrete sub-queues. For exemplary purposes, the EVQ 351 may be replaced with, or divided into, an Acquire Event Queue 351a, a Coordinate Event Queue 351b, a Respond Event Queue 351c, and a Core Event Queue 351d. All SEAMs other than the Acquire, Coordinate and Respond SEAMs, would cause an event to be placed into the Core Event Queue to be executed last in priority after the events in the Acquire, Coordinate and Respond queues.

The sub-queues exist to accommodate different rates at which SEAMS will generate events. The names of the sub-queues used in this example are associated with the SEAM that is posting events to the queue, and it is done for memory and processing optimization, not because some events are a higher priority than others. The sub-queues may be serviced in a certain order or some may be "allocated" more time to be serviced in order to prevent queue overflow, but one sub-queue has no particular "priority" over the others. For example, the sub-queue servicing schedule could be set up to process half of the events in one sub-queue queue and then move on to another sub-queue, and return to the start after each queue has been serviced. Eventually all of the sub-queues queue will be emptied. Such an event sub-queue schedule would prevent a burst condition in one queue causing other queues to overflow due to lack of servicing while the queue with the burst condition was being serviced until empty. In some scheduling routines, the highest priority event sub-queue to be serviced would be the one that is greatest percent full, so the highest priority queue may be constantly changing.

The Acquire event queue 350a exclusively receives events generated for processing the ADER fixed chain and its component SEAMs. The Coordinate event queue exclusively receives events for processing by the Coordinate SEAM and the Respond event queue exclusively receives events for processing by the Respond SEAM. Responses between the SEAMs making up the fixed chains are exclusively placed in the Critical response queue for processing. The final results generated by a fixed chain are placed in other non-critical response queues. Because the Acquire, Coordinate and Respond events are being received into a node (120'-160') independently and are thus asynchronous events, the separation of event queues allows conventional mechanisms and their complexities, such as semaphores and mutexes, to be dispensed with.

FIG. 6 is an exemplary logic flow diagram 400 of the read priority for the workflow service state machine 310 (See also, FIG. 6 steps 1341 and 1350). When an event of any type is received from an outside source or from an internal SEAM by the workflow service, the event is posted to one of the Acquire 350a, Coordinate 350b, Respond 350c or Core event queue 350d for processing. At decision point 405, the workflow service checks to see if a first event queue (e.g., the Acquire event queue) is empty.

If the Acquire event queue is not empty then the event is processed by popping the event from the queue in a first-in-first out order at process 450. The workflow service 310 then determines the appropriate response from the configuration data stored in the DDS 350b and stores the response in the appropriate response queue 352-356. If the Acquire event queue is empty, then the workflow service reads the next scheduled event sub-queue, which in this example is the Coordinate Event Queue 350b at process 410.

If the Coordinate event queue is not empty then the event is processed by popping the event from the queue in a first-in-first out order at process 455. The workflow service 310 then determines the appropriate response from the configuration data stored in the DDS 350b and stores the response in the appropriate response queue 352-356. If the Coordinate event queue is empty, then the workflow service reads the next highest priority event queue, which in this example is the Respond Event Queue 350c at process 415.

If the Respond event queue is not empty then the event is processed by popping the event from the queue in a first-in-first out order at process 460. The workflow service 310 then determines the appropriate response from the configuration data stored in the DDS 350b and stores the response in the appropriate response queue 352-356. If the Respond event queue is empty, then the workflow service reads the lowest priority response queue, which in this example is the Core response queue 356, which receives events from all other SEAMs.

If the Core event queue is not empty then the event is processed by popping the event from the queue in a first-in-first out order at process 465. The workflow service 310 then determines the appropriate response from the configuration data stored in the DDS 350b and stores the response in the appropriate response queue 352-356. If the Core event queue is empty, then the workflow service reads the Critical response from the critical response queue 356 at process 425.

It should be noted at this point that all of the exemplary event queues (Acquire, Coordinate, Respond and Core) must be empty before a single element in a response queues can be addressed by the workflow service 310. Hence, it is immaterial from the point of view of processing the first response in the highest priority response queue as to what order each of the event queues are processed. Other queue servicing schedules or algorithms could be used to insure that all queues are serviced to adequately provide for a specific design requirement.

If the Critical response queue 356 is not empty then the response is processed by popping a response from the queue in a first-in-first out order at process 470. The workflow service 310 then determines the appropriate SEAM to execute the task in the response from the configuration data stored in the DDS 350b and invokes the determined SEAM to execute the response. If the Critical response queue is empty, then the workflow service reads the next highest priority response queue, which in this example is the HP response queue 352 at process 430. It should be noted that the Critical response queue 356 receives responses from fixed SEAMs only. Hence, responses from the exemplary ADER fixed SEAMs are placed into the Critical response queue 356. The purpose for this is to ensure the rapid execution of the priority response tasks generated by the ADER fixed SEAMs regardless to whether they were generated from the Acquire event queue or the Core event queue.

If the HP response queue 352 is not empty then the response is processed by popping a response from the queue in a first-in-first out order at process 475. The workflow service 310 then determines the appropriate SEAM to execute the task in the response from the configuration data stored in the DDS 350b and sends the response to the determined SEAM for processing. If the HP response queue is empty, then the workflow service reads the next highest priority response queue, which in this example is the TDQ response queue 353 at process 435.

If the TDQ response queue 353 is not empty then the response is processed by popping a response from the queue in time delay order at process 480. The workflow service 310 then determines the appropriate SEAM to execute the task in the response from the configuration data stored in the DDS 350b and sends the response to the determined SEAM for processing. If the TDQ 353 response queue is empty, then the workflow service reads the next highest priority response queue, which in this example is the PQ response queue 354 at process 440. The TDQ 353 response queue conditionally operates on a time delay 436 such that even if the TDQ 353 is not empty, the next response therein would not be processed unless the time delay for processing the response task (e.g., 1 second) has expired.

If the PQ response queue 354 is not empty then the response is processed by popping a response from the queue in a first-in-first out order at process 490. The workflow service 310 then determines the appropriate SEAM to execute the task in the response from the configuration data stored in the DDS 350b and sends the response to the determined SEAM for processing. If the PQ response queue 354 response queue is empty, then the workflow service reads the next highest priority response queue, which in this example is the AQ response queue 355 at process 445. The PQ 354 response queue conditionally operates on a predetermined time periodicity 441 such that even if the PQ 354 is not empty, the next response therein would not be processed unless the periodicity stipulated for processing the response task (e.g., 1 second) has expired.

If the AQ response queue 355 is not empty then the response is processed by popping a response from the queue in a first-in-first out order at process 490. The workflow service 310 then determines the appropriate SEAM to execute the task in the response from the configuration data stored in the DDS 350b and sends the response to the determined SEAM for processing. When the AQ response queue 355 is found to be empty the workflow service execution ends. The AQ response queue 355 is the response queue for all non-critical responses. Given the entire method 400, only one response record is processed before the workflow service state machine 310 revisits and empties the event queues 351.

As used herein, the term "non-critical" means that the rapid and timely processing of certain events/responses is not required in order to maintain the proper operation of the hierarchical system. Such non-critical events/responses typically have to do with the communication of data requests and the results thereof being communicated back to a user. This is so because the human perception time is very long compared to the rapid response requirements for timely processing of, and communication of, data between system components.

Referring again to FIG. 5, the DDS 350b may also include at least one message buffer 360 for each SEAM (221-264) that has been populated into the EHM 120. However, in some embodiments only SEAMs within the Measure Library may have a message buffer. The DDS 350b may also include a number of record snapshot buffers 370 and circular buffers 380 that store particular dynamic data values obtained from the complex system to be used by the various SEAMs (221-264) for various computations as provided for by the configuration file 185. The data stored in each of the message buffers 360, snapshot buffers 370 and circular buffers 380 is accessed using a data accessor (304) which may be any suitable data accessor software object known in the art. The particular data structure and the location in the DDS 350b for the message buffers 160, circular buffers 380 and snapshot buffers 370, are predetermined and are established in a memory device at run time.

Figure 7:
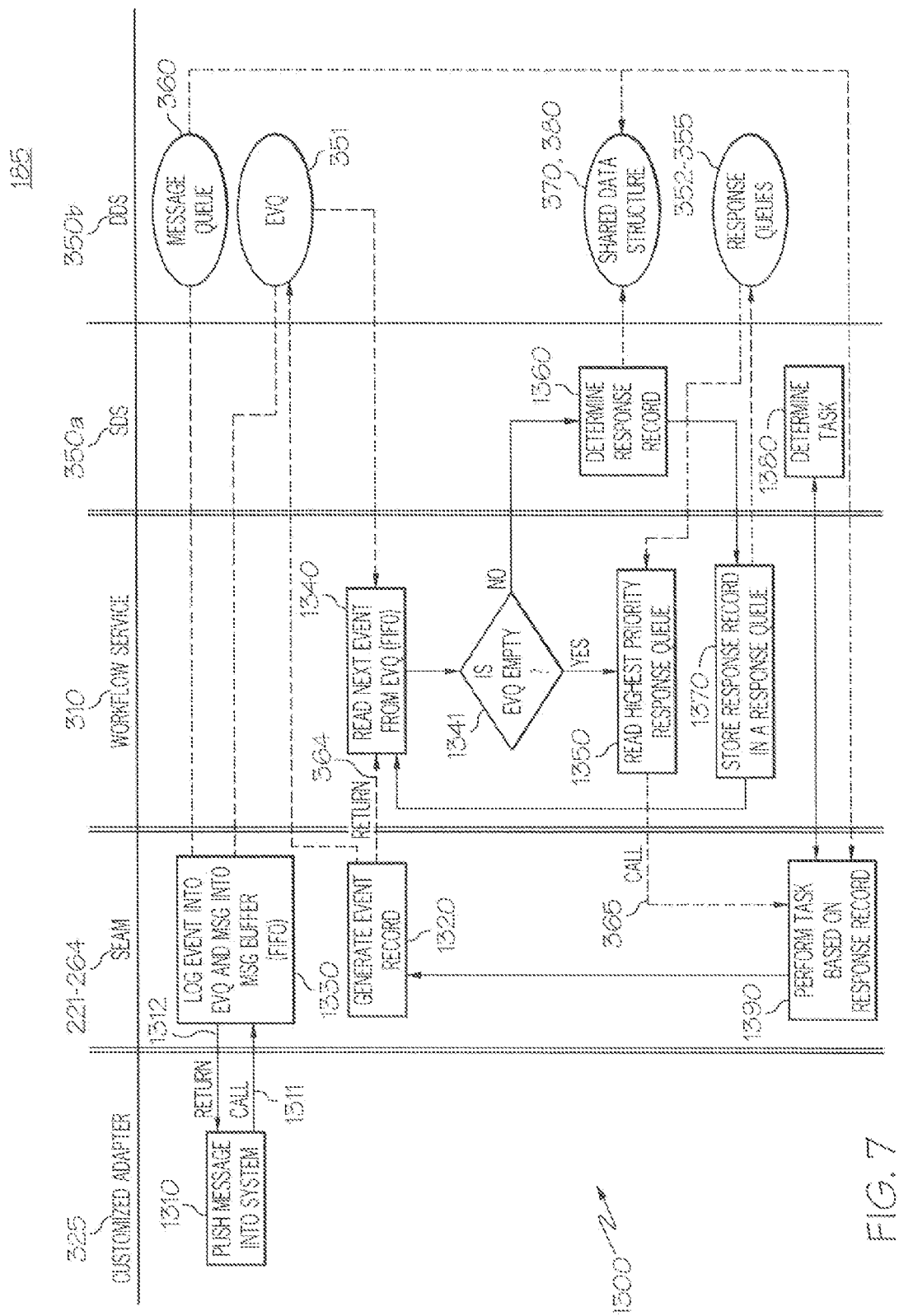
FIG. 7 is a simplified logic flow diagram of the workflow service processing of the event and response queues.

The SDS 350a is a persistent software object 361 that may be manifested or defined as one or more state machines that map a particular event 362 being read by the workflow service module 310 from the Event Queue (EVQ) 351 to a single particular response record 363 (i.e., an event/response relationship) (See FIG. 7). The state machine 361 then assigns a response queue (352-355) into which the response record 363 is to be placed by the workflow service module 310 for eventual reading and execution by the workflow service module 310. The persistent software object 361 may also be a quasi-state machine. A quasi-state machine is defined herein as the persistent data object that produces multiple responses that may be generated by a particular event or produces a limited set of conditional responses that may be data driven. The structure and the location of the persistent software object 361 in the SDS 350a are predetermined and are established in a memory device at run time.

Events 362 may be received into the EVQ 351 in response to a message from an outside source that is handled by the customized adapter 325 of the computing node (120'-160'), as directed by the host executive software 330. Events 362 may also be received from any of the populated SEAMs (221-264) resident in the computing node (120'-160') as they complete a task and produce an event 362.

In the more basic SEAMs such as Sense 223, Acquire 221, Decode 222 and Evaluate 231, the event/response relationships stored within the SDS 350a do not tend to branch or otherwise contain significant conditional logic. As such, the flow of events 362 and response records 363 is relatively straight forward. However, more sophisticated SEAMs such as Coordinate 252, Forecast 255 and Respond 261 may utilize sophisticated algorithms that lead to complicated message/response flows and will not be discussed further herein the interest of brevity and clarity.

As an operational example, the host executive software 330 may push an input message into an EHM 120' that is received from an outside source. The host executive software 330 calls a customized adapter 325 which in turn calls the appropriate SEAM (221-264) resident in the EHM 120' based on data included in the message. For Example, the called SEAM may be the Acquire SEAM 221. When called, the Acquire SEAM 221 places the input message into a message buffer 360 (e.g., the Acquire input message buffer), generates an event 362 and places the event into the EVQ 351. The event 362 may contain data about the complex system from another node or from a local sensor. In the interest of simplicity and clarity of explanation, this first event 362 will be assumed to be an "acquire data" message and the event 362 generated from the input message will be referred to herein as $AQe_1$. In other embodiments the input message $AQ_1$ may be generated by a SEAM (221-264) and the event $AQ_{e1}$ pushed into the EVQ 351 by the SEAM.

Once the input message $AQ_1$ is placed in a message queue 360 and its corresponding event 362 is placed into the EVQ 351, then the Acquire SEAM 221 exits and returns control to the workflow service module 310 via return message 364. In this simple example, only a single processor processing a single command thread is assumed. Thus, while the processor is executing a particular SEAM (221-264), the workflow service module 310 and no other SEAMs are operating. Similarly, while the workflow service module 310 is being operated by the processor, no SEAMS (221-264) are in operation. This is because all steps in the operation are performed sequentially. However, in other embodiments, multiple processors may be used, thereby permitting multiple threads (i.e., multiple workflow service modules 310) to be operated in parallel using the same populated set of SEAMs (221-264) and the same configuration file 185.

Upon receiving the return 364 (See, FIG. 8), the workflow service module 310 resumes operation and reads event $AQ_{e1}$ first in this example because event $AQ_{e1}$ is the first event 362 in the EVQ 351. This is so because the EVQ 351 is the highest priority queue and because the workflow service module 310 may read events sequentially in a first-in-first-out (FIFO) manner. Therefore those of ordinary skill in the art will appreciate that any subsequent events stored in the EVQ 351 would be read in turn by the workflow server on FIFO basis. However, reading events in a FIFO manner is merely exemplary. In equivalent embodiments, the workflow service module may be configured to read events in some other ordinal or prioritized manner.

Once event $AQ_{e1}$ is read, the workflow service module 310 consults the persistent data structures in the SDS 350a to determine the required response record 363 to the event $AQ_{e1}$. The response record 363 provided by the SDS 350a may, for example, be a decode response record $DEC_{r1}$ that directs the Decode SEAM 222 to process the data received from the input message $AQ_1$, which is now stored in a storage location in the DDS 350b. The SDS 350a also directs the workflow service module 310 to place the response record $DEC_{r1}$ into one of the response queues 352-355, such as HPQ 352, and assigns the location in the response queue in which to place the response based on an assigned priority. The SDS 350a may determine the appropriate queue and its priority location in the queue based on the input message type, the data in the input message and on other data such as a priority data field. The workflow service module 310 places the response record $DEC_{r1}$ into the HPQ 352 at the proper prioritized location and returns to read the next event in the EVQ 351.

Because the EVQ 351 is the highest priority event/response queue, the workflow service module 310 continues reading events 362 and posts responses records 363 until the EVQ is empty. When the EVQ 351 is empty, the workflow service module 310 begins working on response records 363 beginning with the highest priority response queue (352-355), which in this example is the HPQ 352.

The first prioritized response record in HPQ 352 in this example is the $DEC_{r1}$ response (i.e., a Decode response). When read, the workflow service module 310 calls (via call 365) a response handler interface of the decode SEAM 222 for the Decode SEAM to operate on the data referenced in the $DEC_{r1}$ response record 363.

After being called by the workflow service module 310, the Decode SEAM 222 consults the SDS 350a with the response record $DEC_{r1}$ to determine what operation it should perform on the data associated with $DEC_{r1}$ and performs it. As disclosed above, a SDS 350a maps the event $DEC_{r1}$ to a predefined response record 363 based on the message type and the data referenced within $DEC_{r1}$. Data associated with event $DEC_{r1}$ may reside in any of the record snapshot buffers 370, circular buffers 380, or the data may have to be queried for from a source located outside the exemplary EHM 120'.

The Decode SEAM 222 operates on the data and generates an event 362 and places the event into the EVQ 351 and a message into the message queue 360. For example, the response record 363 generated by the Decode SEAM 222 may be $EVAL_{e1}$ indicating that the next process is to be performed by the Evaluate SEAM 231. The Decode SEAM 222 then exits and sends a return message 364 back to the workflow service module 310 to resume its operation. The process begins anew with the workflow service module 310 reading the EVQ 351 because there are now new events (including $EVAL_{e1}$) that have been added to the queue.

In the normal course, the work flow service module 310 eventually reads event $EVAL_{e1}$ and consults the SDS 350a to determine the proper response record 363 and which response queue to place it and in what priority within the response queue. In this example the response $EVAL_{r1}$ is also place in the HPQ 352 and is in first priority because the response record $DEC_{r1}$ would have already been operated on and dropped out of the queue. The workflow service then reads the next event from the EVQ 351, and the process continues.

FIG. 7 is a simplified flow chart of a method 1300 for coordinating the operation of various SEAMs (221-264) within a computing node (120'-170'). However, those of ordinary skill in the art will appreciate that the use of multiple processors will allow for multiple threads to be processed in parallel.

At process 1310, an event 362 is pushed into the system by the customized adapter 325 or, in the case of some EHMs 120' by the host executive software 330. In some embodiments, the host executive 330 may make a function call 1311 to a SEAM (221-264) to accept the event message such as the Acquire SEAM 221. At process 1330, the event record 362 is placed into the EVQ 351 by the called Seam (221-264) in the order in which it was received and the input message is stored in a queue or a message buffer 360 resident in the DDS 350b by the SEAM (221-264). The SEAM (221-264) then sends a return command 1312 to the customized adapter 325 and exits.

It is assumed in this simple example, the workflow service module 310 had no other events or response records to process. Therefore the workflow service module 310 may restart at process 1340, although it may restart at any point in its routine. At process 1340, the workflow service module 310 attempts to read the next event record in FIFO order from the EVQ 351. If it is determined that the EVQ 351 is not empty at decision point 1341, then the workflow service module 310 reads the next event 362 from the EVQ and then consults the persistent data (e.g., a state machine) in the SDS 350a with the event 362.

At process 1360, the SDS 350a receives the event 362 as an input and produces a predefined response record 363. The SDS 350a also indicates the response queue (352-355) into which the response record 363 is to be placed, and indicates a priority location for the response record in the response queue as. Any data associated with an event/response record is stored in a shared data structure in the DDS 350b, such as in a circular buffer 380 or in a record snapshot buffer 370.

At process 1370, the workflow service module 310 stores the response record 363 into the assigned response queue (352-355) in its priority order and then returns to process 1340 to read the next event 362.

When the SDS 350a assigns response queues, the highest priority response records 363 are placed in the HPQ 352 in their order of assigned priority and not on a FIFO basis. Response records 363 of lesser priority, such as responses records requiring a time delay may be placed in the TDQ 535. Responses records 363 of still lesser priority may be placed in the PQ 354. Such response records 363 in the PQ 354 may need to be addressed only on a periodic basis, for example.

Response records 363 of the least priority are assigned to the AQ 355 and may be addressed asynchronously as the higher priority response queues permit. Further, response records 363 are placed into one of the response queues 353-355 according to a processing priority that is assigned by the SDS 350a and may or may not be placed on a FIFO basis. The above described loop (1340, 1360, 1370) continues for as long as there are events 362 in the EVQ 351.

If the EVQ 351 is determined to be empty at determination point 1341, then the workflow service module 310 proceeds to the highest priority response queue (352-355) that contains a response record 363 and reads the highest priority response record (e.g. the first or the next response record), at process 1350. When a response record 363 is read, the workflow service module 310 issues a function call 365 to the SEAM (221-264) referenced in the response record 363 to perform its function on the data indicated in the response record 363 and then exits.

At process 1380, the called SEAM (221-264) consults the SDS 350a to determine the task to be performed by the SEAM. Although not strictly required for simple SEAM functions such as the Acquire SEAM 221, more complex SEAMs such as the Forecast SEAM 255 or the Coordinate SEAM 252, for example, may have various alternative algorithms or conditional logic that may be performed. As such the SDS 350a, may direct the SEAM as to which explicit functionality or algorithm to execute.

At process 1390, the designated SEAM performs its function or task on the data associated with the response record 363. Once the SEAM 221-264 performs its function, the method 1300 proceeds to process 1320 where a new event record is generated and placed into the EVQ 351 and the method 1300 repeats.

FIG. 8 is a simplified event-response table 700 used in conjunction with, or as part of, the workflow service state machine 361. The event-response table 700 comprises a list of events 702 that can be processed by each SEAM (221-264) that is populated in a particular node. For every particular event 702 that is processed by a node (120'-160') or is generated within the node, a response record 704 is identified along with the SEAM (221-264) that is to accomplish the response. The event-response table 700 also includes an association of an event queue 351 for each event generated and a response queue (352-356) to receive each response record 704 generated from an event 702.

As discussed above, functionality in a node 120'-160' is established and changed by populating the node with a particular combination of SEAMs 221-264. In simplistic terms when a SEAM 221-264 is added or removed the subset of events and associated responses for each SEAM is added or removed from the event-response table 700.

In regard to the exemplary node event/response table of FIG. 8, the first line entry indicates that when a message with data is received at the node, a "Message Received" event 702 is generated by the Acquire SEAM 221 and is placed in the Acquire event queue 351a to await processing.

The event/response table 700 also indicates that when the workflow service state machine 310 eventually reads the event (See FIG. 6), it refers to the event/response table 700, which indicates that the response 704 to the Message Received event is to parse the message using the Acquire SEAM and to then place the parse response record into the critical response queue 356 for further processing.

When the workflow service 310 eventually reads the critical response queue 356, the Acquire SEAM is called to parse the message (See FIG. 6A-B) and when the parsing is complete a "Message Parsed" event 702 is placed in the Core event queue 351d to await the workflow service 310. The Core event queue is the event queue that receives events that are generated internal to the computing node as opposed to those events generated upon the receipt of a message at the customized adapter 325.

When the workflow service state machine 310 eventually reads the Message Parsed event (See FIGS. 6A-B), it refers to the event/response table 700, which indicates that the response 704 to the Message Parsed event is to process the message using the Decode SEAM 222 and to then place the Process Messages response record into the critical response queue 356 for further processing. Such processing may be to take a data snapshot from a particular sensor. Because the Acquire and Decode SEAMs are part of a fixed chain, their responses are placed in the critical response queue 356 as opposed to the other subordinated response queues 352-355.

When processing is complete, a Snapshot Available event 702 is generated to be accomplished by the Record SEAM 234. The Snapshot Available event is placed in the Core event queue because it is an internally generated event. When the workflow service 310 eventually reads the Snapshot Available event (See FIG. 6A-B), it refers to the event/response table 700, which indicates that there are two responses 704 to the Snapshot Available event. One is to analyze the snapshot using the Analyze SEAM 232 and another is to Prepare the Snapshot data using the Coordinate SEAM. In this example, both of the Analyze Snapshot response record and the Prepare Snapshot response record are placed into the Asynchronous response queue 356 for further processing. Because the responses are not generated from a SEAM in a fixed chain, the response is not assigned to the Critical response queue. Either one, or both of the events can be generated by the Record SEAM upon completion by the user selected choice when the SDS 350a/DDS 350b were configured. The configurable nature of the response records to a "snapshot available" event, for example, is configured in the snapshot specification in the SDS 350a by the user using the data driven modeling tool 171.

When the Analyze Snapshot and the Prepare the Snapshot processes are completed a Send Snapshot Message (i.e., to a location outside the node) event is generated by the Coordinate SEAM and transferred to a remote destination via the customized adapter 325. Also, in this example, a Snapshot Analysis Complete event is also generated and placed in the Core event Queue 351d because it is generated internally to the node. When the workflow service 310 eventually reads the Snapshot Analysis Complete event (See FIG. 6A-B), it refers to the event/response table 700, which indicates that there are two responses 704 to the Snapshot Available event. Both of an Allocate Data and a "trigger another analysis loop" responses are generated and placed into the asynchronous response queue. The Asynchronous queue is the least critical response queue because the response records placed therein are related to reporting information to humans who cannot discern the relatively long processing delays characteristic of responses in the Asynchronous queue.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computerized method for customizing task workflow in a condition based health maintenance ("CBM") system computing node without recompiling software by using a data modeling tool program executing on a computer, the CBM computing node comprising a workflow service state machine and a static data store ("SDS"), the computerized method comprising:
   identifying a first standardized executable application module ("SEAM") from a plurality of available SEAMs, wherein the first SEAM is configured to generate a first event associated with particular data being processed by the first SEAM, and wherein a SEAM is a basic un-modifiable modular software object that is directed to complete a specific task;
   identifying a second SEAM from the plurality of available SEAMs, wherein the second SEAM is configured to generate a subsequent second event associated with the particular data processed by the first SEAM;
   identifying a third SEAM from the plurality of available SEAMs, wherein the third SEAM is configured to generate a subsequent third event associated with the particular data processed by the first SEAM and the second SEAM;
   populating the CBM computing node with the first SEAM, the second SEAM, and the third SEAM;
   creating a quasi-state machine associating multiple unique responses to the first event, associating multiple unique responses to the subsequent second event, and associating multiple unique responses to the subsequent third event; and
   installing the quasi-state machine into the SDS of the computing node from which the workflow service state machine retrieves the multiple unique responses from the quasi-state machine to the first event for processing by the second SEAM to produce the subsequent second event, and retrieves the multiple unique responses from the quasi-state machine to the subsequent second event for processing by the third SEAM to produce the subsequent third event for which the workflow service state machine retrieves the multiple unique responses from the quasi-state machine, wherein the first SEAM, the second SEAM, and the third SEAM are always executed in a fixed order and the events generated by the first SEAM, second SEAM, and third SEAM are not alterable using the data modeling tool program.

2. The computerized method of claim 1, further comprising establishing an un-prioritized set of event queues, wherein those SEAMs of the plurality of SEAMs that process data from sources exterior to the CBM computing node each have a dedicated event queue associated with them.

3. The computerized method of claim 2, further comprising establishing a prioritized set of response queues, wherein the prioritized set of response queues comprise at least critical response queue and one or more lower priority response queues.

4. The computerized method of claim 3, wherein the prioritized set of response queues has a lower priority than all of the un-prioritized set of event queues 5. The computerized method of claim 3, wherein the one or more lower priority response queues comprise a high priority response queue, a time delay response queue, a periodic response queue and an asynchronous response queue.

6. The computerized method of claim 1, wherein an acquire SEAM, a decode SEAM, and an evaluate SEAM are the first SEAM, the second SEAM and the third SEAM, respectively.

7. The computerized method of claim 1, wherein an allocate SEAM, a rank SEAM, and a diagnose SEAM are the first SEAM, the second SEAM and the third SEAM, respectively.

8. The computerized method of claim 1, further including a fourth SEAM following the third SEAM in the fixed order.

9. The computerized method of claim 8, wherein the fourth SEAM is a record SEAM.

10. The computerized method of claim 8 wherein the fourth SEAM is a summarize SEAM.

11. The computerized method of claim 8, wherein the responses associated with events generated by the first SEAM, second SEAM, third SEAM and fourth SEAM, which are always executed in their established order, are placed in the critical response queue for processing.

12. The computerized method of claim 11, wherein responses placed into the critical response queue are executed in a first-in-first-out basis.

13. The computerized method of claim 8, wherein the responses associated with events generated by the first SEAM, second SEAM, third SEAM and fourth SEAM, which are always executed in their established order, are placed in a response queue other than the critical response queue critical response queue for processing.

14. A reconfigurable system for monitoring the health of a complex system comprising:
   a plurality of standardized executable application modules ("SEAM"), each SEAM is a basic un-modifiable modular software object that is directed to complete a specific task; and
   a computing node arranged in a hierarchical structure comprising one or more layers of the computing nodes, wherein the computing node includes:
      a first SEAM, a second SEAM, and a third SEAM selected from the plurality of SEAMs, a workflow service state machine configured to control the execution of the first SEAM, wherein the first SEAM generates a first event associated with particular data being processed by the first SEAM and is configured to control the execution of the second SEAM, wherein the second SEAM generates a subsequent second event associated with the particular data processed by the first SEAM, and the third SEAM generates a subsequent third event associated with the particular data processed by the first SEAM and the second SEAM; and
      a quasi-state machine, the quasi state machine configured to associate multiple unique responses to the first event, associate multiple unique responses to the subsequent second event, and associate multiple unique responses to the subsequent third event, wherein the quasi-state machine resides in a static memory of the computing node from which the workflow service state machine retrieves the multiple unique responses to the first event for processing by the second SEAM to produce the subsequent second event, retrieves the multiple unique responses to the subsequent second event for processing by the third SEAM to produce the subsequent third event for which the workflow service state machine retrieves the multiple unique responses from the quasi-state machine, and wherein the first SEAM, the second SEAM, and the third SEAM are always executed in a fixed order and the events generated by the first SEAM, second SEAM, and third SEAM are not alterable using a data modeling tool program.

\* \* \* \* \*